(12) United States Patent
Burdick et al.

(10) Patent No.: US 7,529,488 B2
(45) Date of Patent: *May 5, 2009

(54) OPTICAL TRANSCEIVER MODULE WITH ONBOARD DIAGNOSTICS ACCESSIBLE VIA PINS

(75) Inventors: Stephan C. Burdick, Cupertino, CA (US); Lewis B. Aronson, Los Altos, CA (US); Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 743 days.

This patent is subject to a terminal disclaimer.

(21) Appl. No.: 11/095,996

(22) Filed: Mar. 30, 2005

(65) Prior Publication Data

US 2005/0196111 A1    Sep. 8, 2005

Related U.S. Application Data

(63) Continuation-in-part of application No. 09/777,917, filed on Feb. 5, 2001, now Pat. No. 7,079,775.

(51) Int. Cl.
*H04B 10/00* (2006.01)
(52) U.S. Cl. .................... 398/137; 398/139
(58) Field of Classification Search ............. 398/117, 398/135, 136, 137, 138, 139
See application file for complete search history.

(56) References Cited

U.S. PATENT DOCUMENTS

| | | | |
|---|---|---|---|
| 4,162,531 A | 7/1979 | Rode et al. ............. | 364/571 |
| 4,545,078 A | 10/1985 | Wiedeburg | |
| 4,559,616 A | 12/1985 | Bruder ............. | 365/28 |
| 4,687,924 A | 8/1987 | Galvin et al. | |
| 4,734,914 A | 3/1988 | Yoshikawa | |
| 4,747,091 A | 5/1988 | Doi | |

(Continued)

FOREIGN PATENT DOCUMENTS

EP        1 168 687        1/2002

(Continued)

OTHER PUBLICATIONS

N.R. Avella, "AN/ARC-144 UHF Multimode Transceiver", Signal, vol. 26, No. 5, (Jan./Feb. 1972) pp. 14-15.

(Continued)

*Primary Examiner*—Christina Y Leung
(74) *Attorney, Agent, or Firm*—Morgan, Lewis & Bockius LLP

(57) ABSTRACT

The optoelectronic transceiver includes a housing, an optical transmitter, an optical receiver, a memory, and an interface. The optical transmitter, receiver, memory, and interface are each disposed at least partially within the housing. The memory is configured for storing information relating to operation of the transceiver. The interface is configured to allow a host to read from host specified locations within the memory. The optoelectronic transceiver also includes a first row of at least five substantially parallel and elongate pins extending from the housing, and a second row of at least five substantially parallel and elongate pins extending from the housing. The second row is substantially parallel to the first row. The optoelectronic transceiver also includes two electrical contacts each aligned with at least one of the first and second rows. The two electrical contacts are configured to be electrically coupled to the interface.

25 Claims, 11 Drawing Sheets

U.S. PATENT DOCUMENTS

| | | | |
|---|---|---|---|
| 4,809,286 A | 2/1989 | Kollanyi et al. | |
| 4,872,080 A | 10/1989 | Hentschel et al. | 361/57 |
| 4,916,707 A | 4/1990 | Rosenkranz | |
| 5,019,769 A | 5/1991 | Levinson | |
| 5,039,194 A | 8/1991 | Block et al. | |
| 5,047,835 A | 9/1991 | Chang | |
| 5,057,932 A | 10/1991 | Lang | |
| 5,334,826 A | 8/1994 | Sato et al. | |
| 5,383,208 A | 1/1995 | Queniat et al. | |
| 5,392,273 A | 2/1995 | Masaki et al. | |
| 5,396,059 A | 3/1995 | Yeates | |
| 5,448,629 A | 9/1995 | Bosch et al. | |
| 5,479,288 A * | 12/1995 | Ishizuka et al. | 398/164 |
| 5,510,924 A | 4/1996 | Terui et al. | |
| 5,515,361 A | 5/1996 | Li et al. | |
| 5,526,164 A | 6/1996 | Link et al. | 359/187 |
| 5,557,437 A | 9/1996 | Sakai et al. | |
| 5,574,435 A | 11/1996 | Mochizuki | |
| 5,594,748 A | 1/1997 | Jabr | |
| 5,673,282 A | 9/1997 | Wurst | |
| 5,801,866 A | 9/1998 | Chan et al. | |
| 5,812,572 A | 9/1998 | King et al. | |
| 5,822,099 A | 10/1998 | Takamatsu | |
| 5,926,303 A | 7/1999 | Giebel et al. | |
| 5,943,152 A | 8/1999 | Mizrahi et al. | |
| 5,953,690 A | 9/1999 | Lemon et al. | |
| 5,956,168 A | 9/1999 | Levinson et al. | |
| 5,987,628 A | 11/1999 | Von Bokern et al. | 714/48 |
| 6,010,538 A | 1/2000 | Sun et al. | |
| 6,014,241 A | 1/2000 | Winter et al. | |
| 6,020,593 A | 2/2000 | Chow et al. | |
| 6,021,947 A | 2/2000 | Swartz | |
| 6,023,147 A | 2/2000 | Cargin, Jr. et al. | |
| 6,049,413 A | 4/2000 | Taylor et al. | |
| 6,064,501 A | 5/2000 | Roberts et al. | |
| 6,115,113 A | 9/2000 | Flockencier | |
| H1881 H | 10/2000 | Davis et al. | |
| 6,160,647 A | 12/2000 | Gilliland et al. | |
| 6,175,434 B1 | 1/2001 | Feng | |
| 6,205,505 B1 | 3/2001 | Jau et al. | |
| 6,222,660 B1 | 4/2001 | Traa | |
| 6,317,804 B1 * | 11/2001 | Levy et al. | 710/305 |
| 6,423,963 B1 | 7/2002 | Wu | |
| 6,473,224 B2 | 10/2002 | Dugan et al. | |
| 6,512,617 B1 | 1/2003 | Tanji et al. | |
| 6,774,942 B1 | 8/2004 | Salcedo et al. | 348/243 |
| 6,802,654 B1 * | 10/2004 | Roberts et al. | 385/88 |
| 6,941,077 B2 * | 9/2005 | Aronson et al. | 398/137 |
| 6,952,531 B2 * | 10/2005 | Aronson et al. | 398/137 |
| 6,957,021 B2 * | 10/2005 | Aronson et al. | 398/137 |
| 7,058,310 B2 * | 6/2006 | Aronson et al. | 398/137 |
| 7,079,775 B2 * | 7/2006 | Aronson et al. | 398/137 |
| 7,184,668 B2 * | 2/2007 | Aronson et al. | 398/137 |
| 7,233,027 B2 | 6/2007 | Neumeuer et al. | 257/98 |
| 2002/0027688 A1 | 3/2002 | Stephenson | |
| 2002/0097468 A1 | 7/2002 | Mecherle et al. | |
| 2002/0181894 A1 | 12/2002 | Gilliland et al. | |
| 2003/0053170 A1 | 3/2003 | Levinson et al. | |
| 2003/0113118 A1 | 6/2003 | Bartur | |
| 2004/0120720 A1 | 6/2004 | Chang et al. | |
| 2004/0202210 A1 | 10/2004 | Thornton | |
| 2004/0240886 A1 | 12/2004 | Aronson et al. | |
| 2005/0031352 A1 | 2/2005 | Light et al. | |

FOREIGN PATENT DOCUMENTS

| | | |
|---|---|---|
| EP | 02 70 4344 | 10/2004 |
| EP | 1471671 A2 | 10/2004 |
| JP | 58140175 A | 6/1987 |
| JP | 62124576 A | 6/1987 |
| JP | 62235975 A | 10/1987 |
| JP | 62281485 A | 12/1987 |
| JP | 404023373 | 1/1992 |
| JP | 06504405 T2 | 5/1994 |
| JP | 06209209 A | 7/1994 |
| JP | 09162811 A | 6/1997 |
| JP | 402102589 | 4/1999 |
| WO | WO 93/21706 | 10/1993 |
| WO | WO 98/00893 | 1/1998 |
| WO | WO 98/00943 | 1/1998 |
| WO | 02/03226 | 5/2002 |
| WO | WO 02/063800 A1 | 8/2002 |
| WO | WO 2004/098100 | 11/2004 |

OTHER PUBLICATIONS

Hausdorf, Reiner, "Mobile Transceiver Measurements with Radiocommunication Service Monitor CMS", News From Rohde & Schwarz, 127, IV, 1989, pp. 4-7.

Mendez, J., "A Circuit to Provide Protection from Surge Voltages (for CB Transceiver)", Revista Española de Electronica, Mayo 1984, pp. 37-39.

Einwaechter and Fritz, "Shortwave Transmitter & Receiver System FuG 101 for Telegraphy and Telephony", Siemens Review XLIII, No. 12, 1976, pp. 526-529.

OptiPort™ SFF BiDi®-Transceiver, V23870-A1133-Kx01, Infineon Technology Data Sheet, Jun. 22, 2004.

Finisar Corp., "App Note AN-2025: Using the Finisar GBIC I²C Test Diagnostics Port," 1998.

Maeda, "Notification of Reason(s) for Refusal," Japanese Patent Application No. JP2002-563630, Nakamura, M. et al., Jul. 13, 2005.

European Search Report dated Jan. 24, 2008 (from related case EP 04777655.4).

* cited by examiner

OPTICAL TRANSCEIVER MODULE WITH ONBOARD DIAGNOSTICS ACCESSIBLE VIA PINS

This application is a continuation-in-part of U.S. patent application Ser. No. 09/777,917, entitled INTEGRATED MEMORY MAPPED CONTROLLER CIRCUIT FOR FIBER OPTICS TRANSCEIVER, filed Feb. 5, 2001 now U.S. Pat. No. 7,079,775, which is incorporated herein in its entirety by this reference.

BACKGROUND

1. Technological Field

The present invention relates generally to the field of fiber optic transceivers and particularly to an optical transceiver module including a controller integrated circuit for serially communicating transceiver diagnostic information to a host via at least two pins that extend to or from the bottom of the optical transceiver module's housing.

2. Description of Related Art

The two most basic electronic circuits within a fiber optic transceiver are the laser driver circuit, which accepts high speed digital data and electrically drives an LED or laser diode to create equivalent optical pulses, and the receiver circuit which takes relatively small signals from an optical detector and amplifies and limits them to create a uniform amplitude digital electronic output. In addition to, and sometimes in conjunction with these basic functions, there are a number of other tasks that must be handled by the transceiver circuitry as well as a number of tasks that may optionally be handled by the transceiver circuit to improve its functionality. These tasks include, but are not necessarily limited to, the following:

Setup functions. These generally relate to the required adjustments made on a part-to-part basis in the factory to allow for variations in component characteristics such as laser diode threshold current.

Identification. This refers to general purpose memory, typically EEPROM (electrically erasable and programmable read only memory) or other nonvolatile memory. The memory is preferably accessible using a serial communication bus in accordance with an industry standard. The memory is used to store various information identifying the transceiver type, capability, serial number, and compatibility with various standards. While not standard, it would be desirable to further store in this memory additional information, such as sub-component revisions and factory test data.

Eye safety and general fault detection. These functions are used to identify abnormal and potentially unsafe operating parameters and to report these to the user and/or perform laser shutdown, as appropriate.

In addition, it would be desirable in many transceivers for the control circuitry to perform some or all of the following additional functions:

Temperature compensation functions. For example, compensating for known temperature variations in key laser characteristics such as slope efficiency.

Monitoring functions. Monitoring various parameters related to the transceiver operating characteristics and environment. Examples of parameters that it would be desirable to monitor include laser bias current, laser output power, received power level, supply voltage and temperature. Ideally, these parameters should be monitored and reported to, or made available to, a host device and thus to the user of the transceiver.

Power on time. It would be desirable for the transceiver's control circuitry to keep track of the total number of hours the transceiver has been in the power on state, and to report or make this time value available to a host device.

Margining. "Margining" is a mechanism that allows the end user to test the transceiver's performance at a known deviation from ideal operating conditions, generally by scaling the control signals used to drive the transceiver's active components.

Other digital signals. It would be desirable to enable a host device to be able to configure the transceiver so as to make it compatible with various requirements for the polarity and output types of digital inputs and outputs. For instance, digital inputs are used for transmitter disable and rate selection functions while digital outputs are used to indicate transmitter fault and loss of signal conditions.

FIG. 1 shows a schematic representation of the essential features of a typical prior-art fiber optic transceiver. The main circuit 1 contains at a minimum transmit and receiver circuit paths and power supply voltage 19 and ground connections 18. The receiver circuit typically consists of a Receiver Optical Subassembly (ROSA) 2 which contains a mechanical fiber receptacle as well as a photodiode and pre-amplifier (preamp) circuit. The ROSA is in turn connected to a post-amplifier (postamp) integrated circuit 4, the function of which is to generate a fixed output swing digital signal which is connected to outside circuitry via the RX+ and RX− pins 17. The postamp circuit also often provides a digital output signal known as Signal Detect or Loss of Signal indicating the presence or absence of suitably strong optical input. The Signal Detect output is provided as an output on pin 18. The transmit circuit will typically consist of a Transmitter Optical Subassembly (TOSA), 3 and a laser driver integrated circuit 5. The TOSA contains a mechanical fiber receptacle as well as a laser diode or LED. The laser driver circuit will typically provide AC drive and DC bias current to the laser. The signal inputs for the AC driver are obtained from the TX+ and TX− pins 12. Typically, the laser driver circuitry will require individual factory setup of certain parameters such as the bias current (or output power) level and AC modulation drive to the laser. Typically this is accomplished by adjusting variable resistors or placing factory selected resistors 7, 9 (i.e., having factory selected resistance values). Additionally, temperature compensation of the bias current and modulation is often required. This function can be integrated in the laser driver integrated circuit or accomplished through the use of external temperature sensitive elements such as thermistors 6, 8.

In addition to the most basic functions described above, some transceiver platform standards involve additional functionality. Examples of this are the external TX disable 13 and TX fault 14 pins described in the GBIC standard. In the GBIC standard, the external TX disable pin allows the transmitter to be shut off by the host device, while the TX fault pin is an indicator to the host device of some fault condition existing in the laser or associated laser driver circuit. In addition to this basic description, the GBIC standard includes a series of timing diagrams describing how these controls function and interact with each other to implement reset operations and other actions. Some of this functionality is aimed at preventing non-eyesafe emission levels when a fault conditions exists in the laser circuit. These functions may be integrated into the laser driver circuit itself or in an optional additional integrated circuit 11. Finally, the GBIC standard also requires the EEPROM 10 to store standardized serial ID information that can be read out via a serial interface (defined as using the serial interface of the ATMEL AT24C01A family of EEPROM products) consisting of a clock 15 and data 16 line.

Similar principles clearly apply to fiber optic transmitters or receivers that only implement half of the full transceiver functions.

The above described transceiver platform standards also set out packaging and size limitations of the optical transceiver module. Therefore, despite including the above described additional functionality, current optical transceivers must still conform to the packaging and size limitations laid out in the transceiver platform standards. For example, presently most small optical transceivers are either Small Form Factor (SFF) or Small Form Factor Pluggable (SFP) optical transceivers. SFF transceivers are smaller than the standard transceivers, such as LC, MT-RJ and MU, and generally have an array of pins that are soldered directly to a printed circuit board. SFP transceivers, on the other hand, can be plugged and unplugged from a host and are not directly soldered to the printed circuit board.

These standardized sizes of optical transceiver modules provide for interchangeability of the optical transceiver modules within larger electronic components. However, as additional functionality is added beyond that required by the transceiver platform standards, the circuitry required for such additional functionality must nevertheless be positioned within the same standardized package. This restricts the amount of additional functionality that can be added to standardized optical transceivers.

In addition, the input and output (I/O) pins or connectors extending from such standardized optical transceivers are also governed by the transceiver platform standards. For example, conventional SFF transceivers have two basic I/O pin configurations, namely a 2×5 pin configuration and a 2×10 pin configuration, where 2×5 indicates two rows of five pins and 2×10 indicates two rows of ten pins. The functionality of each of these pins is also generally dictated by the transceiver platform standards. This restricts access to the additional functionality from an external host, as the standardized number of pins only provide for the I/O requirements of the standard optical transceiver module. In other words, no current mechanism exists for accessing such additional functionality, while retaining the existing footprint and pin locations set by existing transceiver platform standards.

The transceiver platform standards thus operate to restrict, if not prevent, access to additional functionality from an external host, since the standardized number of pins only provide for the I/O requirements of the standard optical transceiver module and are not configured or intended to facilitate implementation of, nor access to, additional functionality.

In view of the foregoing, and other, problems in the art, what is needed is an optical module having a flexible and adaptable system architecture that enables ready implementation of functional enhancements to the optical transceiver. Additionally, embodiments of the optical module should also employ a simple but effective communication mechanism so that information concerning processes performed by or in connection with the optical module can be readily and effectively communicated to a host. As well, implementations of the optical module should maintain conformance with established form factors and other standards.

SUMMARY OF AN EXEMPLARY EMBODIMENT OF THE INVENTION

In general, embodiments of the invention are concerned with an optical transceiver module having a uniform system architecture and associated communication mechanism. More particularly, exemplary embodiments of the invention are directed to an optical transceiver having a memory mapped architecture and a simple serial communication mechanism that enable, among other things, host access to digital diagnostics of the optical transceiver.

According to the invention there is provided an optoelectronic transceiver. The optoelectronic transceiver includes a housing, an optical transmitter, an optical receiver, a controller, a circuit board, first and second rows of electrical contacts, and at least ten elongate pins. The optical transmitter, receiver, controller and circuit board are each positioned at least partially within the housing. The controller includes memory, analog to digital conversion circuitry, and an interface. The memory includes one or more memory arrays for storing information related to the transceiver. The analog to digital conversion circuitry is configured to receive a plurality of analog signals from the optoelectronic transceiver, convert the received analog signals into digital values, and store the digital values in predefined locations within the memory. The analog signals correspond to operating conditions of the optoelectronic transceiver. The interface is configured to allow a host to read from host specified locations within the memory, including the predefined locations.

Both the first row of at least five electrical contacts and the second row of at least six electrical contacts are disposed on the circuit board. The second row is substantially parallel to the first row. The pins each extend from a respective one of the electrical contacts, substantially perpendicular to the circuit board. At least two of the electrical contacts, including one from the second row, are electrically coupled to the interface. Some embodiments resemble typical 2×5, 2×6 or 2×10 SFF optical transceivers. In the case of the 2×6 and 2×10 SFF's, at least two of the pins are coupled to the interface. In the case of the 2×5 SFF, holes are provided in the SFF housing to allow pogo pins to electrically couple to two electrical contacts that are coupled to the interface.

The optical transmitter is configured for transmitting light along a first axis, the optical receiver is configured for receiving light along a second axis, substantially parallel to the first axis, and the circuit board is substantially parallel to a plane formed by connecting the first and second axes.

According to another embodiment, there is provided another optoelectronic transceiver having a housing, an optical transmitter, an optical receiver, a memory, an interface, a first row of at least five electrical contacts, a second row of at least six electrical contacts, and at least ten elongate pins. The memory is positioned at least partially within the housing, and is configured to store information relating to operation of the transceiver. The interface is configured to allow a host to read from host specified locations within the memory. The first row of electrical contacts is disposed at least partially within the housing, while the second row of at least six electrical contacts is disposed at least partially within the housing. The second row is substantially parallel to the first row. At least ten elongate pins each extend from a respective one of the electrical contacts substantially perpendicular one side of the housing. At least two of the electrical contacts are electrically coupled to the interface.

Further, according to yet another embodiment, an optoelectronic transceiver includes a housing, an optical transmitter, an optical receiver, a memory, an interface, a first row of at least five substantially parallel and elongate pins extending from the housing, a second row of at least five substantially parallel and elongate pins extending from the housing, and two electrical contacts. In some embodiments, the two electrical contacts are aligned with the second row. In other embodiments, each of the two electrical contacts are aligned with a different one of the first and second rows. The two electrical contacts are configured to be electrically coupled to the interface either via pins or via pogo pins. The pins may be configured and arranged for substantial conformity with the 2×5 or 2×6 Small Form Factor (SFF) configuration standard.

Still further, another optoelectronic transceiver is provided which includes a housing, an optical transmitter, an optical receiver, a memory, an interface, a first row of at least ten substantially parallel and elongate pins extending from the housing, and a second row of at least ten substantially parallel and elongate pins extending from the housing. The second row is substantially parallel to the first row, and two of the second row of pins are electrically coupled to the interface. The pins may be configured and arranged for substantial conformity with the 2×10 Small Form Factor (SFF) configuration standard, but for the use of the two second row pins that are electrically coupled to the interface.

Accordingly, the optical transceiver module of the present invention includes additional functionality, such as digital diagnostics, that can be accessed by an external host via a suitable communication mechanism At the same time, the optical transceiver module maintains substantial conformance with established configuration, and other, standards.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DETAILED DESCRIPTION OF EXEMPLARY EMBODIMENTS

Figure 1:
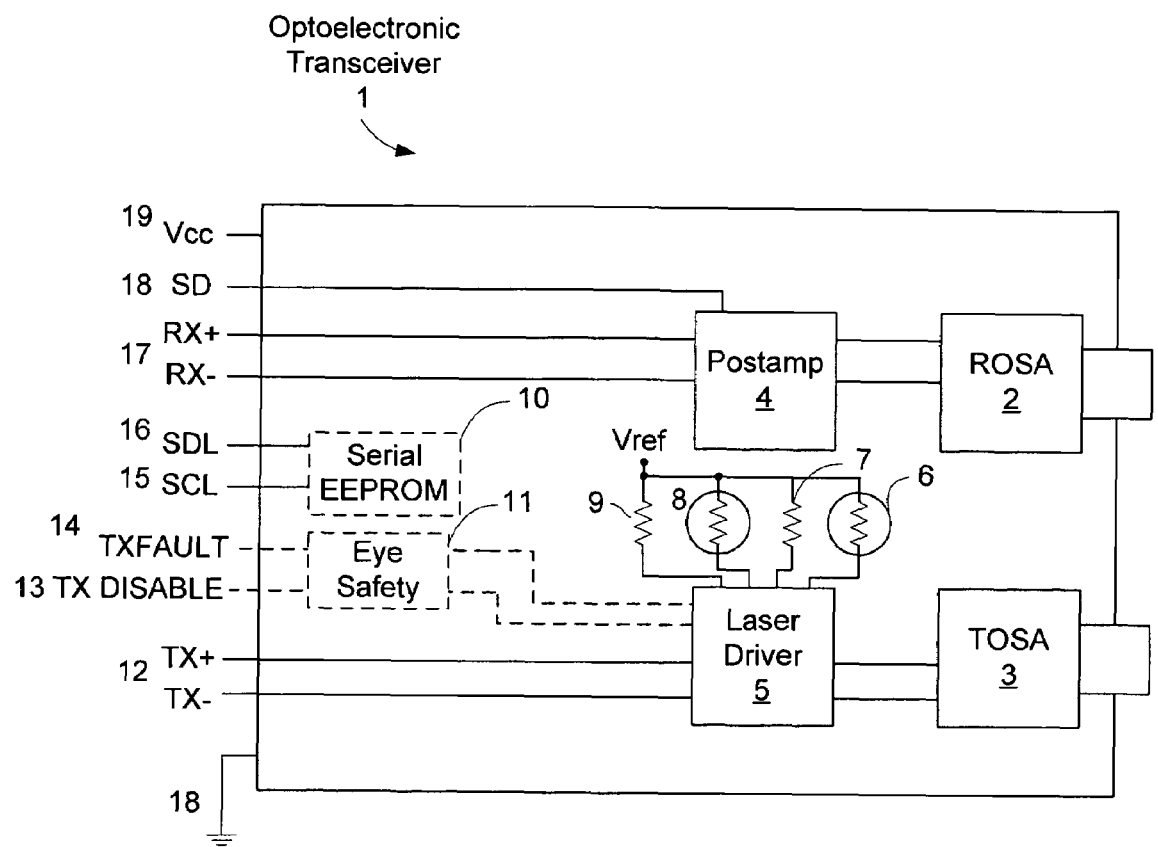
FIG. 1 is a block diagram of a prior art optoelectronic transceiver.
Figure 2:
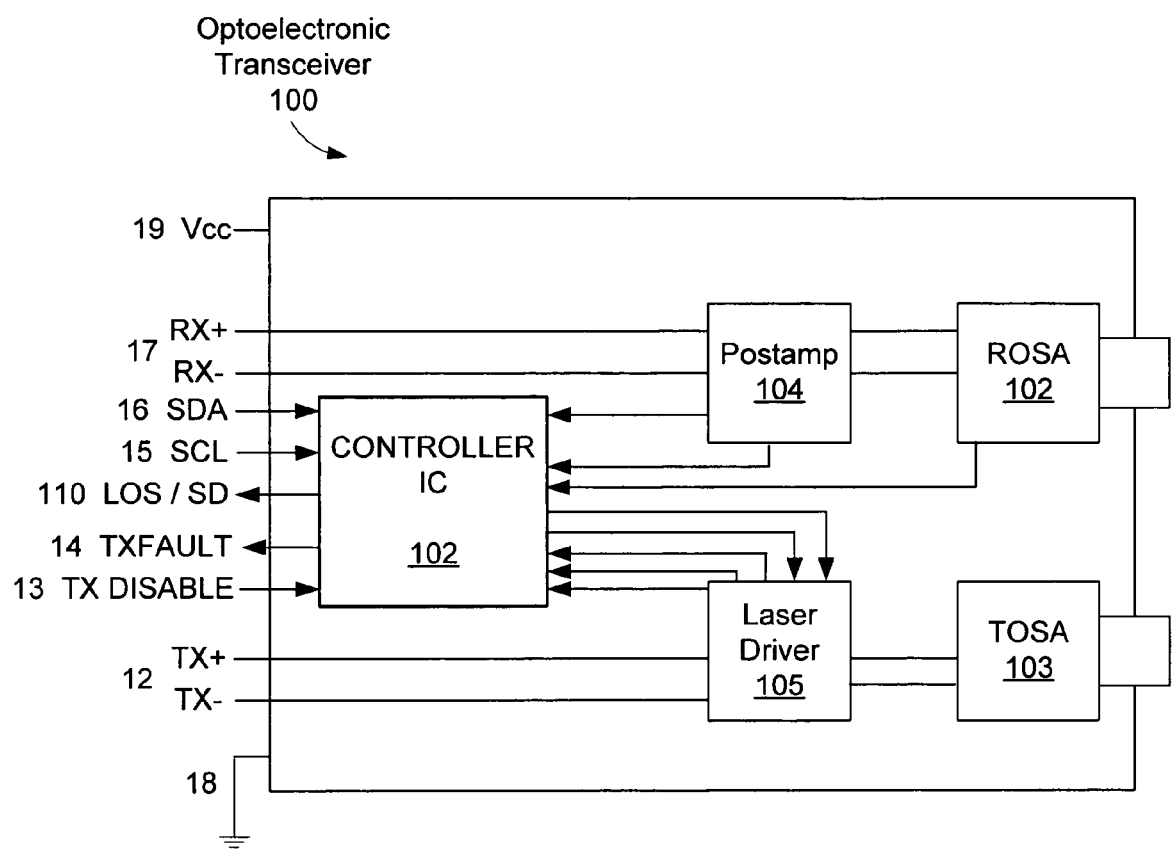
FIG. 2 is a block diagram of an optoelectronic transceiver in accordance with the present invention.
Figure 3:
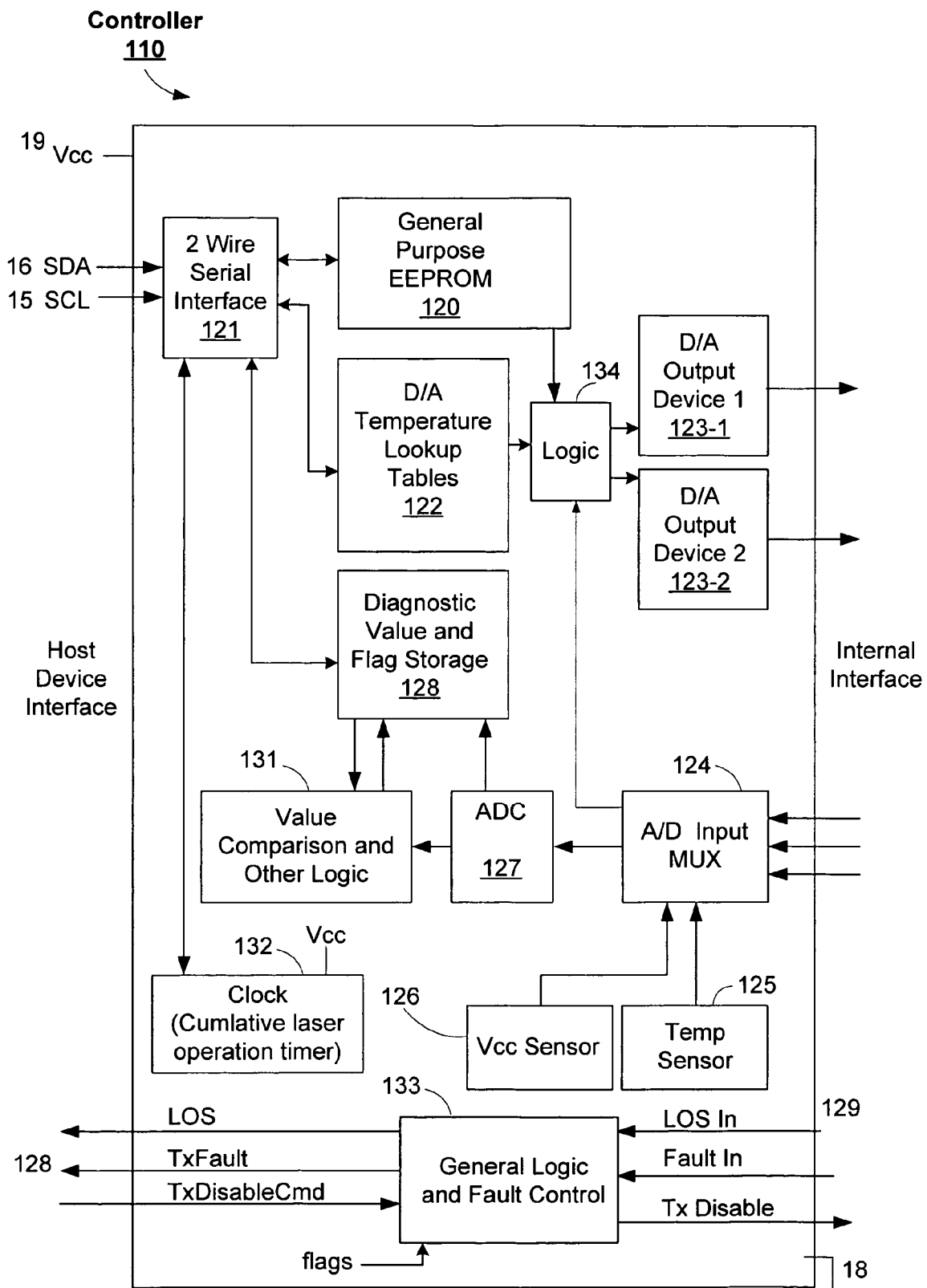
FIG. 3 is a block diagram of modules within the controller of the optoelectronic transceiver of FIG. 2.
Figure 4:
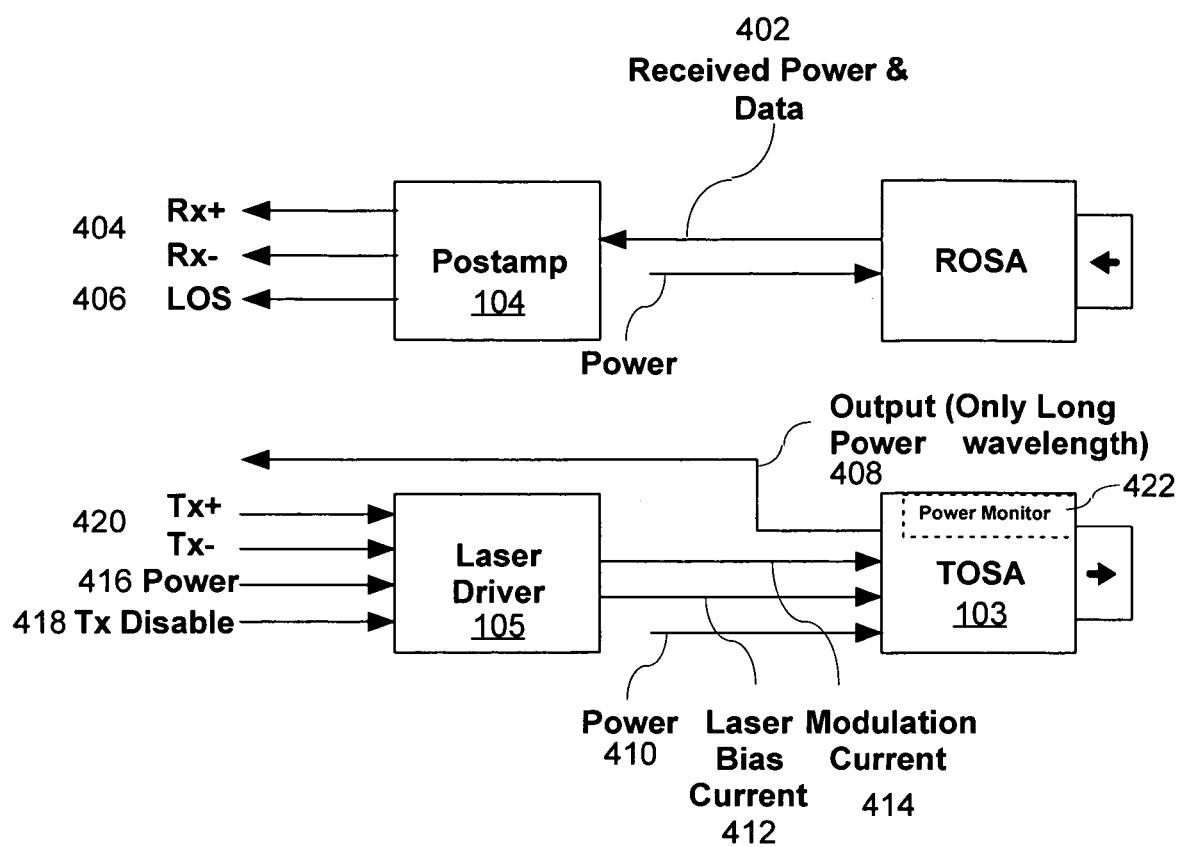
FIG. 4 is a more detailed block diagram of the connections between the controller and the laser driver and post-amplifier.

A transceiver 100 based on the present invention is shown in FIGS. 2 and 3. The transceiver 100 contains a Receiver Optical Subassembly (ROSA) 102 and Transmitter Optical Subassembly (TOSA) 103 along with associated post-amplifier 104 and laser driver 105 integrated circuits that communicate the high speed electrical signals to the outside world. In this case, however, all other control and setup functions are implemented with a third single-chip integrated circuit 110 called the controller IC.

The controller IC 110 handles all low speed communications with the end user. These include the standardized pin functions such as Loss of Signal (LOS) or Signal Detect (SD) 111, Transmitter Fault Indication (TX FAULT) 14, and the Transmitter Disable Input (TXDIS) 13. The controller IC 110 has a two wire serial interface 121, also called the memory interface, for accessing memory mapped locations in the controller. Memory Map Tables 1, 2, 3 and 4, below, are an exemplary memory map for one embodiment of a transceiver controller, as implemented in some embodiments of the present invention. It is noted that Memory Map Tables 1, 2, 3 and 4, in addition to showing a memory map of values and control features described in this document, also show a number of parameters and control mechanisms that are outside the scope of this document and thus are not part of the present invention.

The interface 121 is coupled to host device interface input/output lines, typically clock (SCL) and data (SDL) lines, 15 and 16. In some embodiments, the serial interface 121 operates in accordance with the two wire serial interface standard that is also used in the GBIC and SFP standards, however other serial interfaces could equally well be used in alternate embodiments. The two wire serial interface 121 is used for all setup and querying of the controller IC 110, and enables access to the optoelectronic transceiver's control circuitry as a memory mapped device. That is, tables and parameters are set up by writing values to predefined memory locations of one or more nonvolatile memory devices 120, 122, 128 (e.g., EEPROM devices) in the controller, whereas diagnostic and other output and status values are output by reading predetermined memory locations of the same nonvolatile memory devices 120, 122, 128. This technique is consistent with currently defined serial ID functionality of many transceivers where a two wire serial interface is used to read out identification and capability data stored in EEPROM.

It is noted here that some of the memory locations in the memory devices 120, 122, 128 are dual ported, or even triple ported in some instances. That is, while these memory mapped locations can be read and in some cases written via the serial interface 121, they are also directly accessed by other circuitry in the controller 110. For instance, certain "margining" values stored in memory 120 are read and used directly by logic 134 to adjust (i.e., scale upwards or downwards) drive level signals being sent to the D/A output devices 123. Similarly, there are flags stored in memory 128 that are (A) written by logic circuit 131, and (B) read directly by logic circuit 133. An example of a memory mapped location not in memory devices but that is effectively dual ported is the output or result register of clock 132. In this case the accumulated time value in the register is readable via the serial interface 121, but is written by circuitry in the clock circuit 132.

In addition to the result register of the clock 132, other memory mapped locations in the controller may be implemented as registers at the input or output of respective sub-circuits of the controller. For instance, the margining values used to control the operation of logic 134 may be stored in registers in or near logic 134 instead of being stored within memory device 128. In another example, measurement values generated by the ADC 127 may be stored in registers. The memory interface 121 is configured to enable the memory interface to access each of these registers whenever the memory interface receives a command to access the data stored at the corresponding predefined memory mapped location. In such embodiments, "locations within the memory" include memory mapped registers throughout the controller.

In an alternate embodiment, the time value in the result register of the clock 132, or a value corresponding to that time value, is periodically stored in a memory location with the memory 128 (e.g., this may be done once per minute, or once per hour of device operation). In this alternate embodiment, the time value read by the host device via interface 121 is the last time value stored into the memory 128, as opposed to the current time value in the result register of the clock 132.

As shown in FIGS. 2 and 3, the controller IC 110 has connections to the laser driver 105 and receiver components. These connections serve multiple functions. The controller IC has a multiplicity of D/A converters 123. In the preferred embodiment the D/A converters are implemented as current sources, but in other embodiments the D/A converters may be implemented using voltage sources, and in yet other embodiments the D/A converters may be implemented using digital potentiometers. In the preferred embodiment, the output signals of the D/A converters are used to control key parameters of the laser driver circuit 105. In one embodiment, outputs of the D/A converters 123 are use to directly control the laser bias current as well as to control the level of AC modulation to the laser (constant bias operation). In another embodiment, the outputs of the D/A converters 123 of the controller 110 control the level of average output power of the laser driver 105 in addition to the AC modulation level (constant power operation).

In a preferred embodiment, the controller 110 includes mechanisms to compensate for temperature dependent characteristics of the laser. This is implemented in the controller 110 through the use of temperature lookup tables 122 that are used to assign values to the control outputs as a function of the temperature measured by a temperature sensor 125 within the controller IC 110. In alternate embodiments, the controller 110 may use D/A converters with voltage source outputs or may even replace one or more of the D/A converters 123 with digital potentiometers to control the characteristics of the laser driver 105. It should also be noted that while FIG. 2 refers to a system where the laser driver 105 is specifically designed to accept inputs from the controller 110, it is possible to use the controller IC 110 with many other laser driver ICs to control their output characteristics.

In addition to temperature dependent analog output controls, the controller IC may be equipped with a multiplicity of temperature independent (one memory set value) analog outputs. These temperature independent outputs serve numerous functions, but one particularly interesting application is as a fine adjustment to other settings of the laser driver 105 or postamp 104 in order to compensate for process induced variations in the characteristics of those devices. One example of this might be the output swing of the receiver postamp 104. Normally such a parameter would be fixed at design time to a desired value through the use of a set resistor. It often turns out, however, that normal process variations associated with the fabrication of the postamp integrated circuit 104 induce undesirable variations in the resulting output swing with a fixed set resistor. Using the present invention, an analog output of the controller IC 110, produced by an additional D/A converter 123, is used to adjust or compensate the output swing setting at manufacturing setup time on a part-by-part basis.

In addition to the connection from the controller to the laser driver 105, FIG. 2 shows a number of connections from the laser driver 105 to the controller IC 110, as well as similar connections from the ROSA 106 and Postamp 104 to the controller IC 110. These are analog monitoring connections that the controller IC 110 uses to provide diagnostic feedback to the host device via memory mapped locations in the controller IC. The controller IC 110 in the preferred embodiment has a multiplicity of analog inputs. The analog input signals indicate operating conditions of the transceiver and/or receiver circuitry. These analog signals are scanned by a multiplexer 124 and converted using an analog to digital converter (ADC) 127. The ADC 127 has 12 bit resolution in the preferred embodiment, although ADC's with other resolution levels may be used in other embodiments. The converted values are stored in predefined memory locations, for instance in the diagnostic value and flag storage device 128 shown in FIG. 3, and are accessible to the host device via memory reads. These values may be calibrated to standard units (such as millivolts or microwatts) as part of a factory calibration procedure.

The digitized quantities stored in memory mapped locations within the controller IC include, but are not limited to, the laser bias current, transmitted laser power, and received power (as measured by the photodiode detector in the ROSA 102). In the memory map tables (e.g., Table 1), the measured laser bias current is denoted as parameter $B_{in}$, the measured transmitted laser power is denoted as $P_{in}$, and the measured received power is denoted as $R_{in}$. The memory map tables indicate the memory locations where, in an exemplary implementation, these measured values are stored, and also show where the corresponding limit values, flag values, and configuration values (e.g., for indicating the polarity of the flags) are stored.

As shown in FIG. 3, the controller 110 includes a voltage supply sensor 126. An analog voltage level signal generated by this sensor is converted to a digital voltage level signal by the ADC 127, and the digital voltage level signal is stored in memory 128. In a preferred embodiment, the A/D input multiplexer (mux) 124 and ADC 127 are controlled by a clock signal so as to automatically, periodically convert the monitored signals into digital signals, and to store those digital values in memory 128.

Furthermore, as the digital values are generated, the value comparison logic 131 of the controller compares these values to predefined limit values. The limit values are preferably stored in memory 128 at the factory, but the host device may overwrite the originally programmed limit values with new limit values. Each monitored signal is automatically compared with both a lower limit and upper limit value, resulting in the generation of two limit flag values that are then stored in the diagnostic value and flag storage device 128. For any monitored signals where there is no meaningful upper or lower limit, the corresponding limit value can be set to a value that will never cause the corresponding flag to be set.

The limit flags are also sometimes call alarm and warning flags. The host device (or end user) can monitor these flags to determine whether conditions exist that are likely to have caused a transceiver link to fail (alarm flags) or whether conditions exist which predict that a failure is likely to occur soon. Examples of such conditions might be a laser bias current which has fallen to zero, which is indicative of an immediate failure of the transmitter output, or a laser bias current in a constant power mode which exceeds its nominal value by more than 50%, which is an indication of a laser end-of-life condition. Thus, the automatically generated limit flags are useful because they provide a simple pass-fail decision on the transceiver functionality based on internally stored limit values.

In a preferred embodiment, fault control and logic circuit 133 logically OR's the alarm and warning flags, along with the internal LOS (loss of signal) (or Signal Detect (SD)) input and Fault Input signals, to produce a binary Transceiver fault (TxFault) signal that is coupled to the host interface, and thus made available to the host device. The host device can be programmed to monitor the TxFault signal, and to respond to an assertion of the TxFault signal by automatically reading all the alarm and warning flags in the transceiver, as well as the corresponding monitored signals, so as to determine the cause of the alarm or warning.

The fault control and logic circuit 133 furthermore conveys a loss of signal (LOS) signal received from the receiver circuit (ROSA, FIG. 2) to the host interface.

Yet another function of the fault control and logic circuit 133 is to determine the polarity of its input and output signals in accordance with a set of configuration flags stored in memory 128. For instance, the Loss of Signal (LOS) output of circuit 133 may be either a logic low or logic high signal, as determined by a corresponding configuration flag stored in memory 128.

Other configuration flags (see Table 4) stored in memory 128 are used to determine the polarity of each of the warning and alarm flags. Yet other configuration values stored in memory 128 are used to determine the scaling applied by the ADC 127 when converting each of the monitored analog signals into digital values.

In an alternate embodiment, another input to the controller 102, at the host interface, is a rate selection signal. In FIG. 3 the rate selection signal is input to logic 133. This host generated signal would typically be a digital signal that specifies the expected data rate of data to be received by the receiver (ROSA 102). For instance, the rate selection signal might have two values, representing high and low data rates (e.g., 2.5 Gb/s and 1.25 Gb/s). The controller responds to the rate selection signal by generating control signals to set the analog receiver circuitry to a bandwidth corresponding to the value specified by the rate selection signal.

As described above, the controller IC 110 provides additional functionality including onboard diagnostics of the optical transceiver module and control of components within the optical transceiver module, such as controlling laser bias current. Such additional functionality is accessed by a host device via the serial interface 121. Particularly, the controller IC 110 is coupled to a host via clock (SCL) and data (SDL) lines, 15 and 16. As described above, the serial interface 121 operates in accordance with the two wire serial interface standard that is also used in the GBIC and SFP standards. In a preferred embodiment, the serial interface 121, is preferably an I²C (Inter-IC) or MDIO serial bus. An I2C or I²C bus is a bi-directional two-wire serial bus that provides a communication link between integrated circuits, whereas an MDIO bus is a Management Data Input/Output bus as described by the IEEE 802.3 specification. Alternatively, any other suitable bi-directional serial interface could be used.

The serial interface 121 is used for all setup and querying of the controller IC 110, and enables access to the optoelectronic transceiver's control circuitry as a memory mapped device. That is, tables and parameters are set up by writing values to predefined memory locations of one or more nonvolatile memory devices 120, 122, 128 (e.g., EEPROM devices) in the controller IC, whereas diagnostic and other output and status values are output by reading predetermined memory locations of the same nonvolatile memory devices 120, 122, 128.

As described above, one of the most prevalent types of current standardized optical transceivers is the Small Form Factor (SFF) optical transceiver. Such SFF optical transceivers have a standard footprint and typically include either 2×5 or 2×10 pin arrays. 2×5 pin arrays have two parallel rows of five pins each, while 2×10 pin arrays have two parallel rows of ten pins each. The functions of each of these pins is typically governed by industry standards. However, as described above, it is desirable to access the serial interface 121 of the controller IC 110 via the clock (SCL) line 15 and data (SDL) line 16. Specifically, it is desirable to directly access memory mapped locations within the optical transceiver module via these clock and data lines. Accordingly, the present invention provides a mechanism of accessing the controller IC 110 while retaining the standardized SFF footprint and pin layout.

Figure 5C:
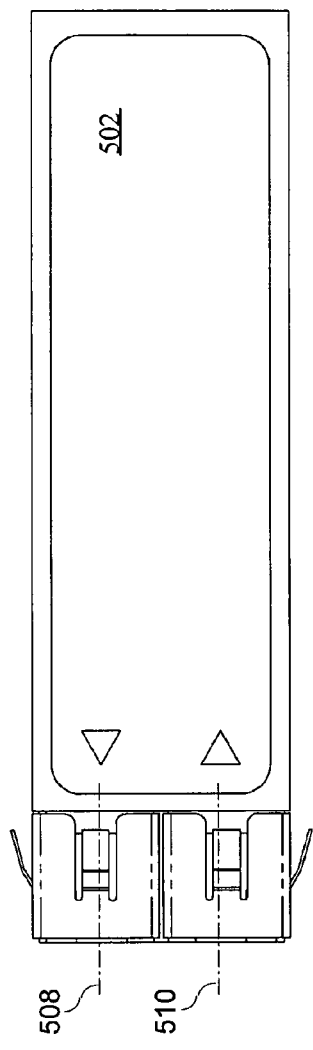
FIG. 5A is a side view, FIG. 5B a front view, FIG. 5C a top view, and FIG. 5D a bottom view of an optical transceiver module according to an embodiment of the invention.
Figure 5A:
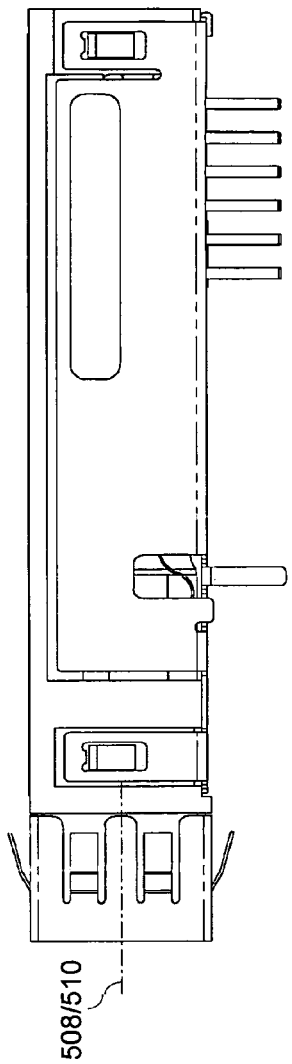
Figure 5D:
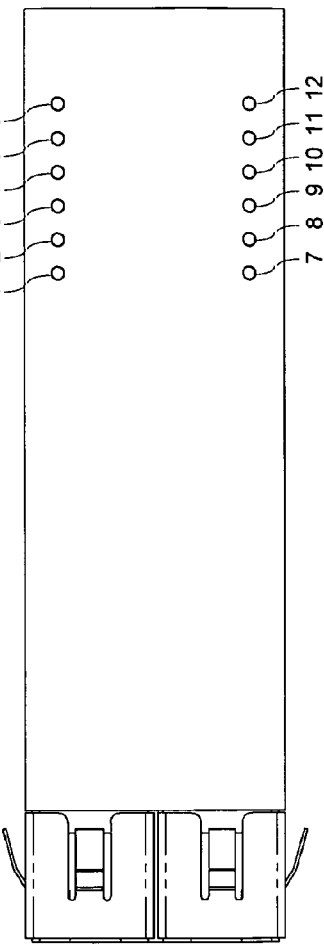
Figure 5B:
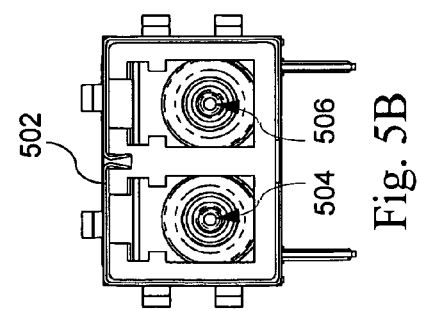

FIG. 5A is a side view, FIG. 5B a front view, FIG. 5C a top view, and FIG. 5D a bottom view of an optical transceiver module 500 according to a preferred embodiment of the present invention. As can be seen in FIG. 5B, the optical transceiver module 500 includes a housing 502, an optical transmitter 504 positioned at least partially within the housing, and an optical receiver 506 positioned at least partially within the housing. The optical transmitter 504 preferably forms part of a Transmitter Optical Subassembly (TOSA) and the optical receiver 506 preferably forms part of a Receiver Optical Subassembly (ROSA). As seen in FIG. 5C, the optical transmitter 504 is configured for transmitting light along a first axis 508, while the optical receiver 506 is configured for receiving light along a second axis 510. The first axis 508 is preferably substantially parallel to the second axis 510. Additionally, as described above, the optical transceiver module may also further include some or all of the following components: a laser driver, a laser bias controller, a power controller, a pre-amplifier, a post-amplifier, a laser wavelength controller, a main controller, a electrothermal cooler, an analog-to-digital converter, a digital-to analog converter, an Avalanche Photodiode (APD) bias controller, or the like positioned within said housing.

The external appearance of the optical transceiver module 500 is similar to that of existing 2×5 SFF optical transceivers, except that the optical transceiver module 500 includes two additional pins for accessing the controller IC. As best seen in FIG. 5D, an array of 12 pins is provided, namely pins 1-6 and 7-12. Pins 2-6 and 8-12 preferably corresponds to the 2×5 pins of current 2×5 SFF optical transceiver modules. Also in a preferred embodiment, pins 1-6 are spaced equidistant from one another, i.e., having a constant pitch. Similarly, in a preferred embodiment, pins 7-12 are spaced equidistant from one another, i.e., having a constant pitch. Also, the row of pins 1-6 is preferably parallel to the row of pins 7-12. Pin 1 is preferably positioned between pins 2-6 and the optical transmitter and receiver, while pin 7 is preferably positioned between pin 8-12 and the optical transmitter and receiver. Accordingly, this optical transceiver module embodiment could be called a 2×6 SFF optical transceiver module.

Additional pins 1 and 7 provide access to the controller IC and onboard diagnostics. That is, additional pins 1 and 7 are configured to serially communicate digital diagnostic information between the controller IC and a host. Pin 1 is therefore coupled to the data (SDL) line 16 and pin 7 is coupled to the clock (SCL) line 15 of the serial interface 121. In an alternative embodiment the functions of pins 1 and 7 are reversed, with Pin 1 coupled to the clock (SCL) line 15 and Pin 7 coupled to the data (SDL) line 16. The pins preferably extend away from the housing 502 at an angle substantially perpendicular to the first and second axes 508 and 510. Also, the pins 1-6 and 7-12 are preferably header connectors, i.e., pin fields that are positioned in a plastic housing that mounts directly onto a printed board. The plastic mounting provides both insulation and stability to the elongate pins. Also, the pins may be configured for repeated pluggability into corresponding female sockets coupled to the printed circuit board.

In some embodiments, the second pin 2 is a receiver ground pin; the third pin 3 is a receiver power pin, which is typically coupled to a power supply operating at +3.3V; the fourth pin 4 is a signal detect pin; the fifth pin 5 is a receive data (Data Out) inverted pin; the sixth pin 6 is a receive data (Data Out) pin; the eighth pin 8 is a transmitter power pin, which is typically coupled to a power supply operating at +3.3V; the ninth pin 9 is a transmitter ground pin; the tenth pin 10 is a transmitter disable pin; the eleventh pin 11 is a transmit data (Data In) pin; and the twelfth pin 12 is a transmit data (Data In) inverted pin. This assignment of functions to pins is compatible with the industry standards, including the Small Form Factor Multisource Agreement (SFF MSA). It should, however, be appreciated that pin functions may be assigned differently.

Also in a preferred embodiment, the first pin 1 is a serial communication data (SDL) pin and the seventh pin 7 is a serial communication clock (SCL) pin. Alternatively, any of the pins may be used for the following functionality: a serial communication data pin, a receiver ground pin, a receiver power pin, a signal detect pin, a receive data inverted pin, a receive data pin, a serial communication clock pin, a transmitter power pin, a transmitter ground pin, a transmitter disable pin, a transmit data pin, a transmit data inverted pin, a loss of signal pin, or the like.

Figure 6C:
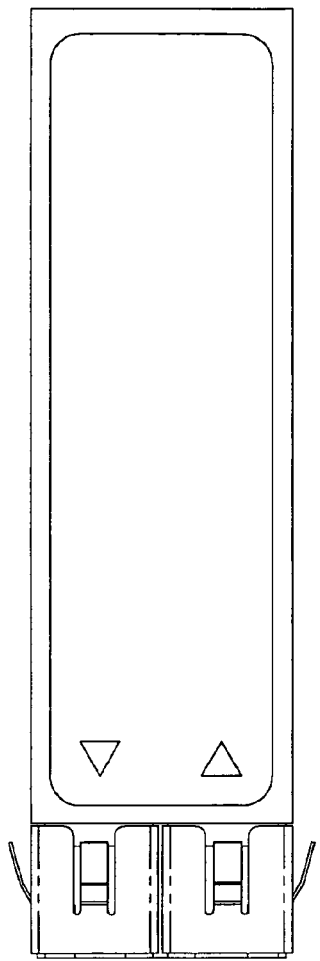
FIG. 6A is a side view, FIG. 6B a front view, FIG. 6C a top view, and FIG. 6D a bottom view of an optical transceiver module according to another embodiment of the invention.
Figure 6A:
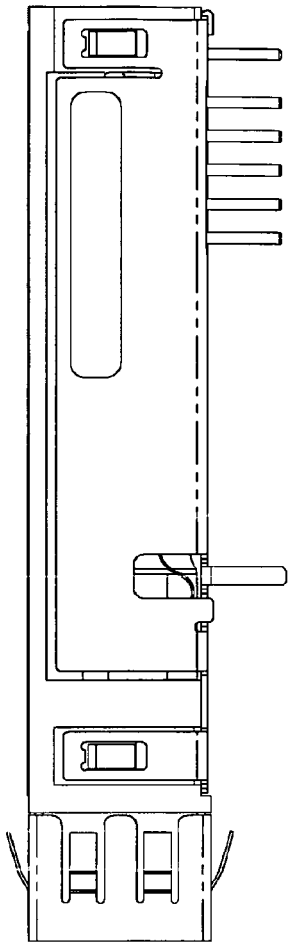
Figure 6D:
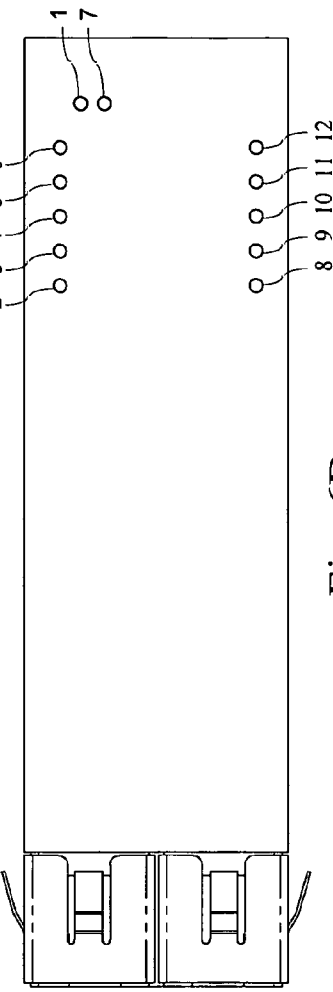
Figure 6B:
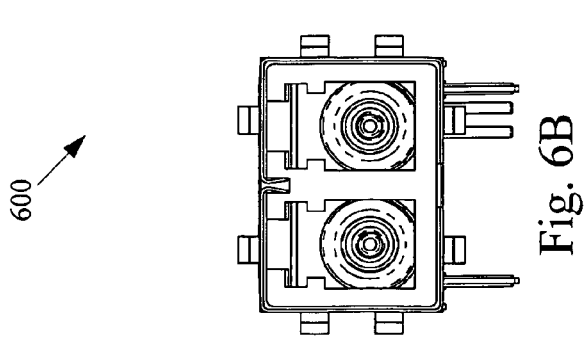

FIG. 6A is a side view, FIG. 6B a front view, FIG. 6C a top view, and FIG. 6D a bottom view of an optical transceiver module 600 according to another embodiment of the invention. The pins 2-6 and 8-12 correspond exactly to that of a standard 2×5 SFF optical transceiver. Indeed, this optical transceiver module 600 is identical to the optical transceiver module 500 shown in FIGS. 5A-5D except here the additional pins for serial communication, namely pins 1 and 7 are positioned behind and to one side of the array of 2×5 pins. That is, the pins are positioned on an opposite side of the 2×5 pins to the transmitter and receiver, and nearer pins 2-6. In an alternative embodiment, pins 1 and 7 are replaced by holes, as described below in relation to FIGS. 9A-9D.

Figure 7C:
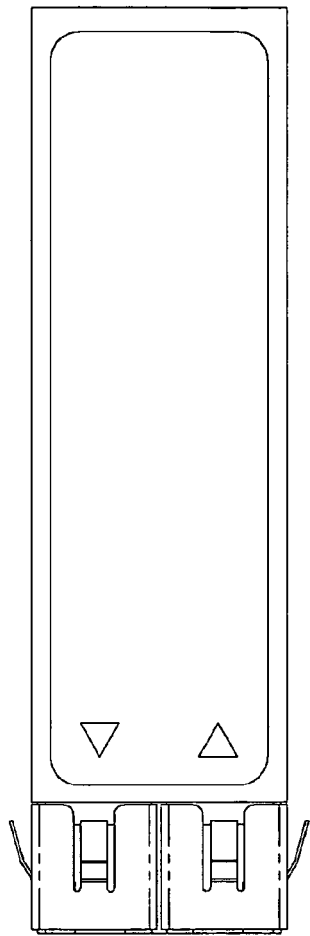
FIG. 7A is a side view, FIG. 7B a front view, FIG. 7C a top view, and FIG. 7D a bottom view of an optical transceiver module according to yet another embodiment of the invention.
Figure 7A:
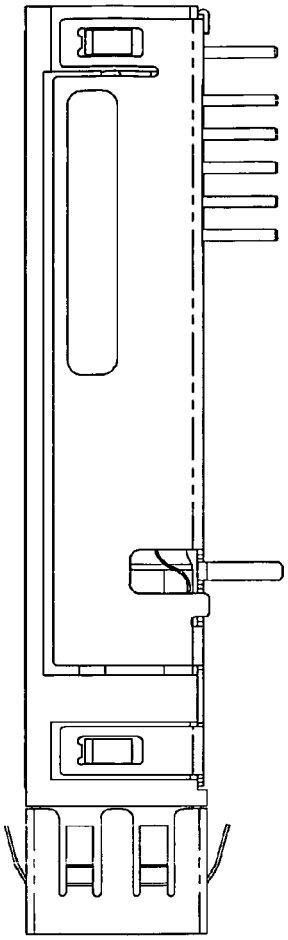
Figure 7D:
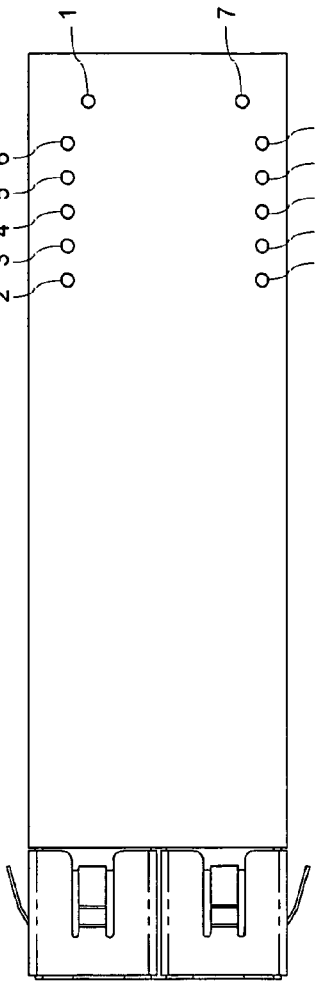
Figure 7B:
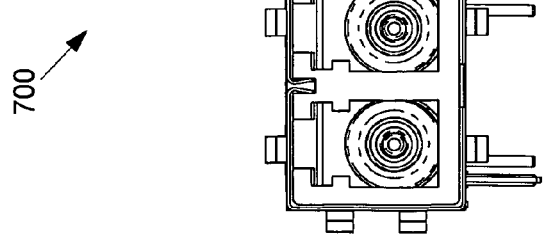

FIG. 7A is a side view, FIG. 7B a front view, FIG. 7C a top view, and FIG. 7D a bottom view of an optical transceiver module 700 according to another embodiment of the invention. The pins 2-6 and 8-12 correspond exactly to that of a standard 2×5 SFF optical transceiver. Indeed, this optical transceiver module 700 is identical to the optical transceiver module 600 shown in FIGS. 6A-6D except here the additional pins for serial communication, namely pins 1 and 7 are positioned behind and to the center of the array of 2×5 pins. That is, the pins are positioned on an opposite side of the 2×5 pins to the transmitter and receiver, and between the row of pins 2-6 and the row of pins 8-12. Alternatively, the additional pins for serial communication may be positioned at any suitable location.

Accordingly, the optical transceiver modules 500, 600, and 700 include additional functionality that can be accessed by an external host via at least two additional pins that extend substantially perpendicular to the bottom of the housing of the optical transceiver. This allows standardized packaging, footprint, and form factor requirements to be met, while providing access to the additional functionality, such as onboard diagnostics, within the optical transceiver module.

In yet another embodiment, transmitter disable pin (Tx disable) may alternatively function as an interrupt pin. In use, when a potential problem is diagnosed by the controller IC, it notifies the host of a potential problem by transmitting a signal out of the interrupt pin. This prompts the host to poll or query the onboard diagnostics provided by the controller IC via the SDL and SCL pins 1 and 7. In yet another embodiment, the same pin may be used as both a Tx disable pin and an interrupt pin using techniques that are well know to those skilled in the art, such as multiplexing, or the like.

By providing an interrupt pin, or interrupt signaling function, the computational overhead on the host device may be substantially reduced, because the host device will no longer have to periodically query the transceiver module to determine if it has encountered any operational problems. Alternately, the host device will need to query the transceiver module much less often than if the transceiver module did not have an interrupt pin or function. For example, the host device might query the transceiver module to determine its status once per hour (or once per day or any other suitably long period of time), instead of at a much high rate, with the host device relying on the interrupt pint or function to signal it if any operational problem develop during the intervening period. As a result of the interrupt pin or function, the host device is not required to use a significant fraction of its resources to monitor the performance of the transceiver module.

Figure 8C:
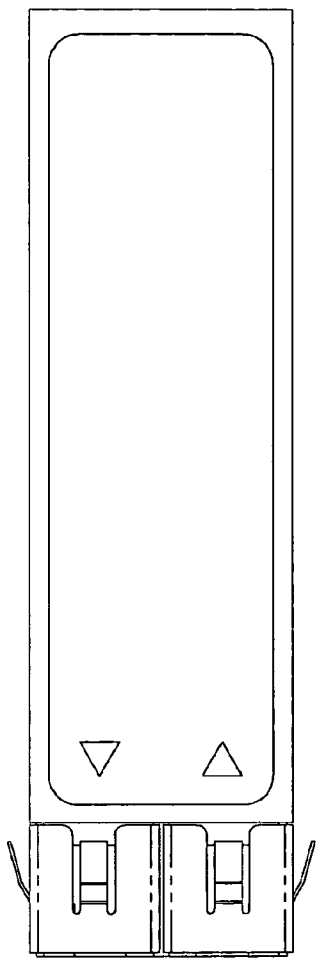
FIG. 8A is a side view, FIG. 8B a front view, FIG. 8C a top view, and FIG. 8D a bottom view of an optical transceiver module according to one other embodiment of the invention.
Figure 8A:
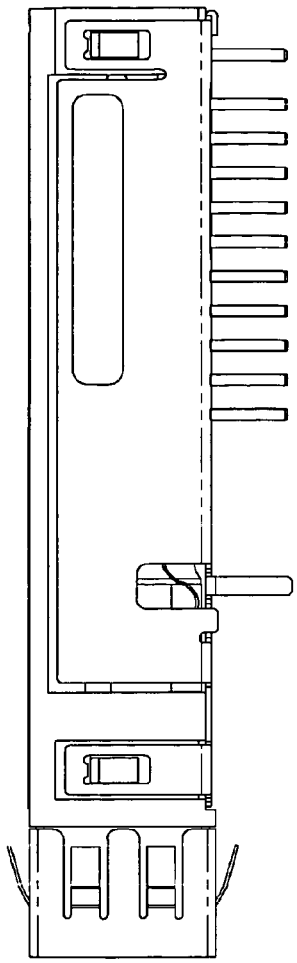
Figure 8D:
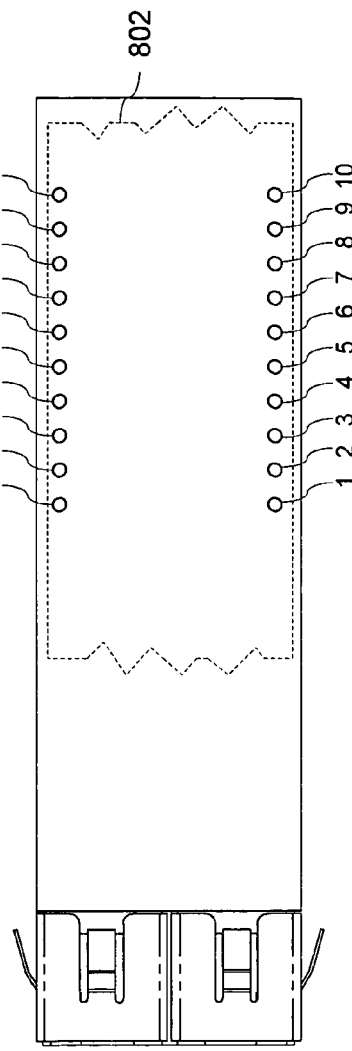
Figure 8B:
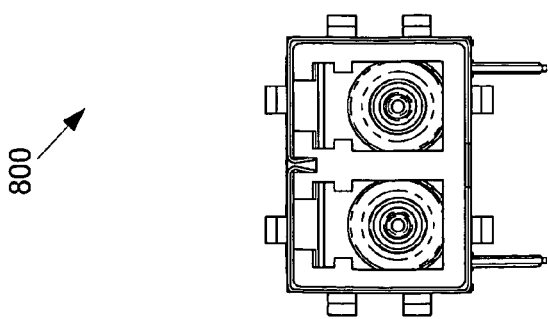

FIG. 8A is a side view, FIG. 8B a front view, FIG. 8C a top view, and FIG. 8D a bottom view of an optical transceiver module 800. The optical transceiver module 800 is similar to the optical transceiver modules 500, 600 and 700 described above, however, the optical transceiver module 800 includes two parallel rows of 10 pins instead of two parallel rows of five pins.

In some embodiments, each pin is electrically and mechanically coupled to a circuit board 802 (or more than one circuit board) within the housing at a respective electrical contact. Also in some embodiments, the optical transmitter is configured for transmitting light along a first axis, the optical receiver is configured for receiving light along a second axis substantially parallel to said first axis, and the circuit board 802 is substantially parallel to a plane formed between said first and second axes.

Each pin may be coupled to the circuit board 802 via header connectors or the like. As described above, header connectors are pin fields that are positioned in a plastic housing that mount directly onto the circuit board 802. The plastic mounting provides both insulation and stability to the elongate pins. Also in some embodiments, the pins may be configured for repeated pluggability into corresponding female sockets coupled to another circuit board.

From the exterior, the optical transceiver module 800 is identical in appearance to a regular or standard 2×10 SFF optical transceiver, i.e., has two rows of 10 pins in each row. The pin designations for a standard 2×10 SFF optical transceiver are as follows:

| Pin No. 2 × 10 | Symbol | Functional Description |
| --- | --- | --- |
| 1 | Photodetector Bias | Photodetector Bias |
| 2 | Vee$_r$ | Receiver Signal Ground Bar |
| 3 | Vee$_r$ | Receiver Signal Ground |
| 4 | Clk− | Received Recover Clock Out Bar |
| 5 | Clk+ | Received Recover Clock Out |
| 6 | Vee$_r$ | Receiver Signal Ground |
| 7 | Vcc$_r$ | Receiver Power Supply |
| 8 | SD | Signal Detect Normal Operation |
| 9 | RD− | Received Data Out Bar |
| 10 | RD+ | Received Data Out |
| 11 | Vcc$_t$ | Transmitter Power Supply |
| 12 | Vee$_t$ | Transmitter Signal Ground |
| 13 | TDis | Transmitter Disable |
| 14 | TD+ | Transmitter Data In |
| 15 | TD− | Transmitter Data In Bar |
| 16 | Vee$_t$ | Transmitter Signal Ground |
| 17 | Bmon (−) | Laser Diode Bias Current Monitor - Negative End |
| 18 | Bmon (+) | Laser Diode Bias Current Monitor - Positive End |
| 19 | Pmon(−) | Laser Diode Optical Power Monitor - Negative End |
| 20 | Pmon (+) | Laser Diode Optical Power Monitor - Positive End |

However, it has been found that users of the standard 2×10 SFF optical tranceivers do not make use of the Received Recover Clock Out pins, i.e., pins 4 and 5 of the 2×10 optical transceivers. Accordingly, in some embodiments, the functionality of pin 4 and pin 5 have been replaced with digital diagnostic access functionality. That is, existing pins 4 and 5 are configured to serially communicate digital diagnostic information between the controller IC and a remote host.

In some embodiments, pin 4 is coupled to the SDL line 16 (FIGS. 2 and 3) and pin 5 is coupled to the clock (SCL) line 15 (FIGS. 2 and 3) of the serial interface 121 (FIG. 3). In alternative embodiments, the functions of pins 4 and 5 are reversed, with pin 4 coupled to the clock (SCL) line 15 (FIGS. 2 and 3) and pin 5 coupled to the data (SDL) line 16 (FIGS. 2 and 3). The size, orientation and type of pins are identical to that described above in relation to FIGS. 5-7. Accordingly, the revised pin designations for the 2×10 SFF optical transceiver module 800 are as follows:

| Pin No. 2 × 10 | Symbol | Functional Description |
| --- | --- | --- |
| 1 | Photodetector Bias | Photodetector Bias |
| 2 | Vee$_r$ | Receiver Signal Ground Bar |
| 3 | Vee$_r$ | Receiver Signal Ground |
| 4 | SDL | Digital Diagnostic Data |
| 5 | SCL | Clock |
| 6 | Vee$_r$ | Receiver Signal Ground |
| 7 | Vcc$_r$ | Receiver Power Supply |
| 8 | SD | Signal Detect Normal Operation |
| 9 | RD− | Received Data Out Bar |
| 10 | RD+ | Received Data Out |
| 11 | Vcc$_t$ | Transmitter Power Supply |
| 12 | Vee$_t$ | Transmitter Signal Ground |
| 13 | TDis | Transmitter Disable |
| 14 | TD+ | Transmitter Data In |
| 15 | TD− | Transmitter Data In Bar |
| 16 | Vee$_t$ | Transmitter Signal Ground |
| 17 | Bmon (−) | Laser Diode Bias Current Monitor - Negative End |
| 18 | Bmon (+) | Laser Diode Bias Current Monitor - Positive End |
| 19 | Pmon(−) | Laser Diode Optical Power Monitor - Negative End |
| 20 | Pmon (+) | Laser Diode Optical Power Monitor - Positive End |

The above described embodiment of the 2×10 SFF optical transceiver module 800 allows access to the controller and digital diagnostics without the need for additional pins and/or non-standard pin layouts. Moreover, the pin layout dictated by the SFF Standards do not need to be changed. Accordingly, existing female sockets for receiving the pins may be used, thereby reducing the design and manufacturing costs of producing female sockets for non-standard pin layouts. If necessary, existing female sockets may need to be rewired to take advantage of the newly added access to the controller IC and digital diagnostics.

Figure 9C:
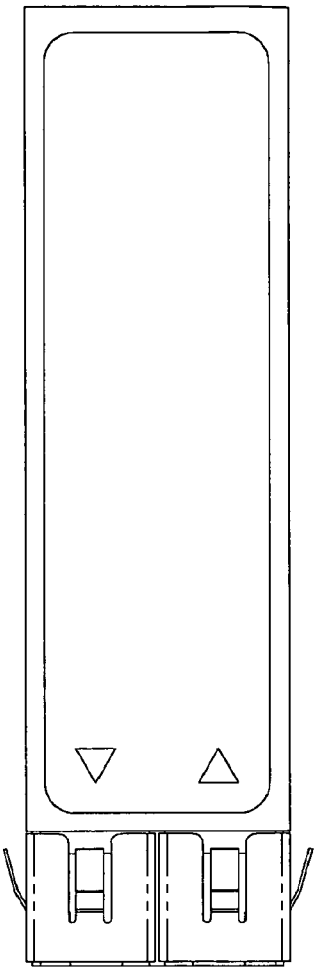
FIG. 9A is a side view, FIG. 9B a front view, FIG. 9C a top view, and FIG. 9D a bottom view of an optical transceiver module according to yet another embodiment of the invention.
Figure 9A:
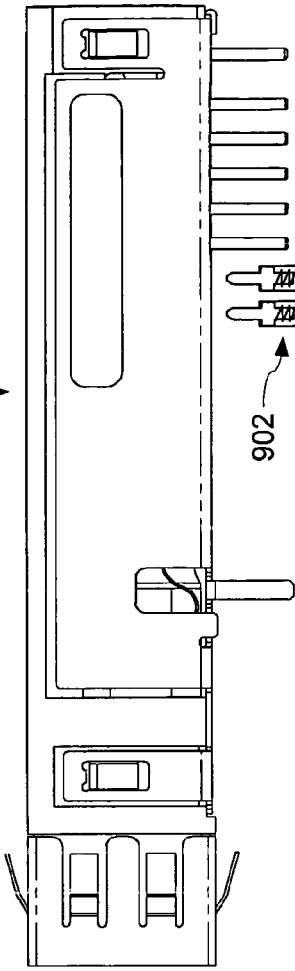
Figure 9D:
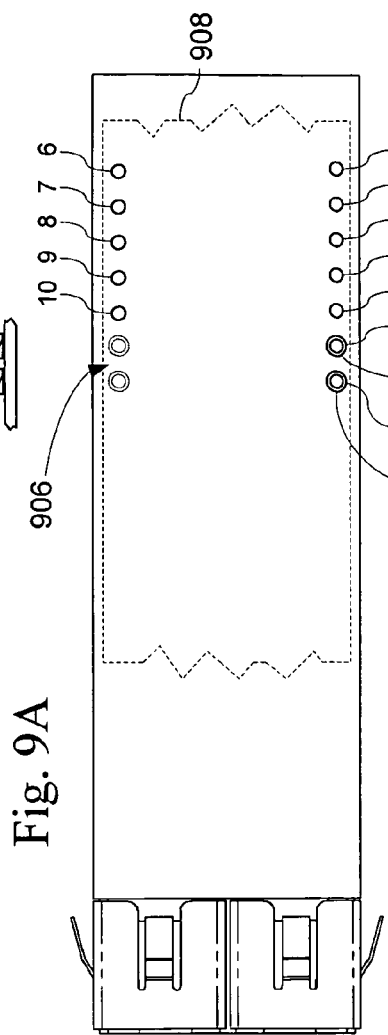
Figure 9B:
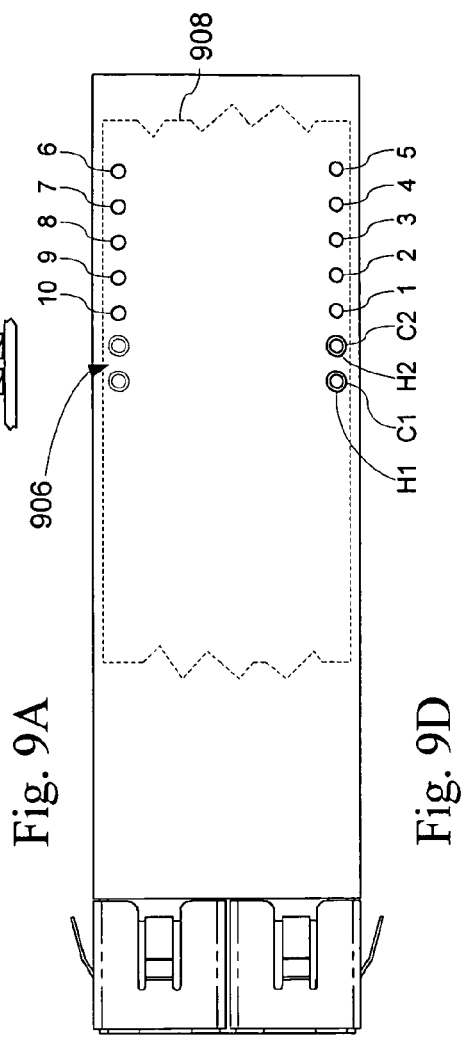

FIG. 9A is a side view, FIG. 9B a front view, FIG. 9C a top view, and FIG. 9D a bottom view of an optical transceiver module 900, according to another embodiment of the invention. This embodiment of the optical transceiver is a 2×5 SFF optical transceiver. From the exterior, the optical transceiver module 900 is similar in appearance to a regular or standard 2×5 SFF optical transceiver, i.e., has two rows of 5 pins in each row.

In some embodiments, each pin is electrically and mechanically coupled to a circuit board 908 (or more than one circuit board) within the housing at a respective electrical contact. Each pin may be coupled to the circuit board 908 via header connectors or the like. As described above, header connectors are pin fields that are positioned in a plastic housing that mount directly onto the circuit board 908. The plastic mounting provides both insulation and stability to the elongate pins. Also in some embodiments, the pins may be configured for repeated pluggability into corresponding female sockets coupled to another circuit board.

The optical transceiver module 900 looks like a standard 2×5 optical transceiver module having two parallel rows of five pins each. However, the optical transceiver module 900 includes two holes H1 and H2 through the housing 502 (FIG. 5). These holes H1 and H2 correspond to the position where the fourth and fifth pins were located in the 2×10 SFF optical transceiver module 800 described above in relation to FIG. 8. Electrical contacts C1 and C2 are provided on the circuit board 908 within the optical transceiver module 900, such that each electrical contact is aligned with a respective one of holes H1 and H2 in a direction parallel to the pins. In some embodiments, the electrical contacts may be copper or solder bumps on a circuit board within the housing 502 (FIG. 5). In an alternative embodiment, the electrical contacts C1 and C2 are positioned on the circuit board 908 where pins 16 and 17 are located in the 2×10 SFF optical transceiver module 800 described above in relation to FIG. 8. The location of the holes H1 and H2 and electrical contacts C1 and C2 for the alternative embodiment are shown by phantom lines 906. In yet another embodiment, the holes H1 and H2 are located at any position where a pin and respective contact of the 2×10 SFF transceiver is located, as described above.

The electrical contact C1 is coupled to the SDL line 16 (FIGS. 2 and 3) and electrical contact C2 is coupled to the clock (SCL) line 15 (FIGS. 2 and 3) of the serial interface 21

(FIG. 3). In alternative embodiments, the functions of the electrical contacts C1 and C2 are reversed, with C1 coupled to the clock (SCL) line 15 (FIGS. 2 and 3) and C2 coupled to the data (SDL) line 16 (FIGS. 2 and 3). Accordingly, the pin designations for a 2×5 SFF optical transceiver module 900 are as follows:

| Pin No. 2 × 5 | Symbol | Functional Description |
| --- | --- | --- |
| C1 | SDL | Digital Diagnostic Data |
| C2 | SCL | Clock |
| 1 | $Vee_r$ | Receiver Signal Ground |
| 2 | $Vcc_r$ | Receiver Power Supply |
| 3 | SD | Signal Detect Normal Operation |
| 4 | RD− | Received Data Out Bar |
| 5 | RD+ | Received Data Out |
| 6 | $Vcc_t$ | Transmitter Power Supply |
| 7 | $Vee_t$ | Transmitter Signal Ground |
| 8 | TDis | Transmitter Disable |
| 9 | TD+ | Transmitter Data In |
| 10 | TD− | Transmitter Data In Bar |

In yet other embodiments, pins 1-10 may be used for their usual functions, while For example, pins 1 through 10 may extend from the circuit board 908 with one hole at the H2 position shown and one hole at one of the positions 906.

In some embodiments, pogo pins 902 may be used to electrically connect a host to the electrical contacts C1 and C2. Each of the holes H1 and H2 is configured and dimensioned to receive a pogo pin there-through. In other words, in use, when the pins of the optical transceiver module 900 are inserted into a female socket (not shown) by pressing the module toward the socket as shown by arrow 908, the pogo pins 902 pass through the holes H1 and H2 and make contact with the electrical contacts C1 and C2. In this way, a remote host can access the controller IC via the electrical contacts and pogo pins.

Figure 10:
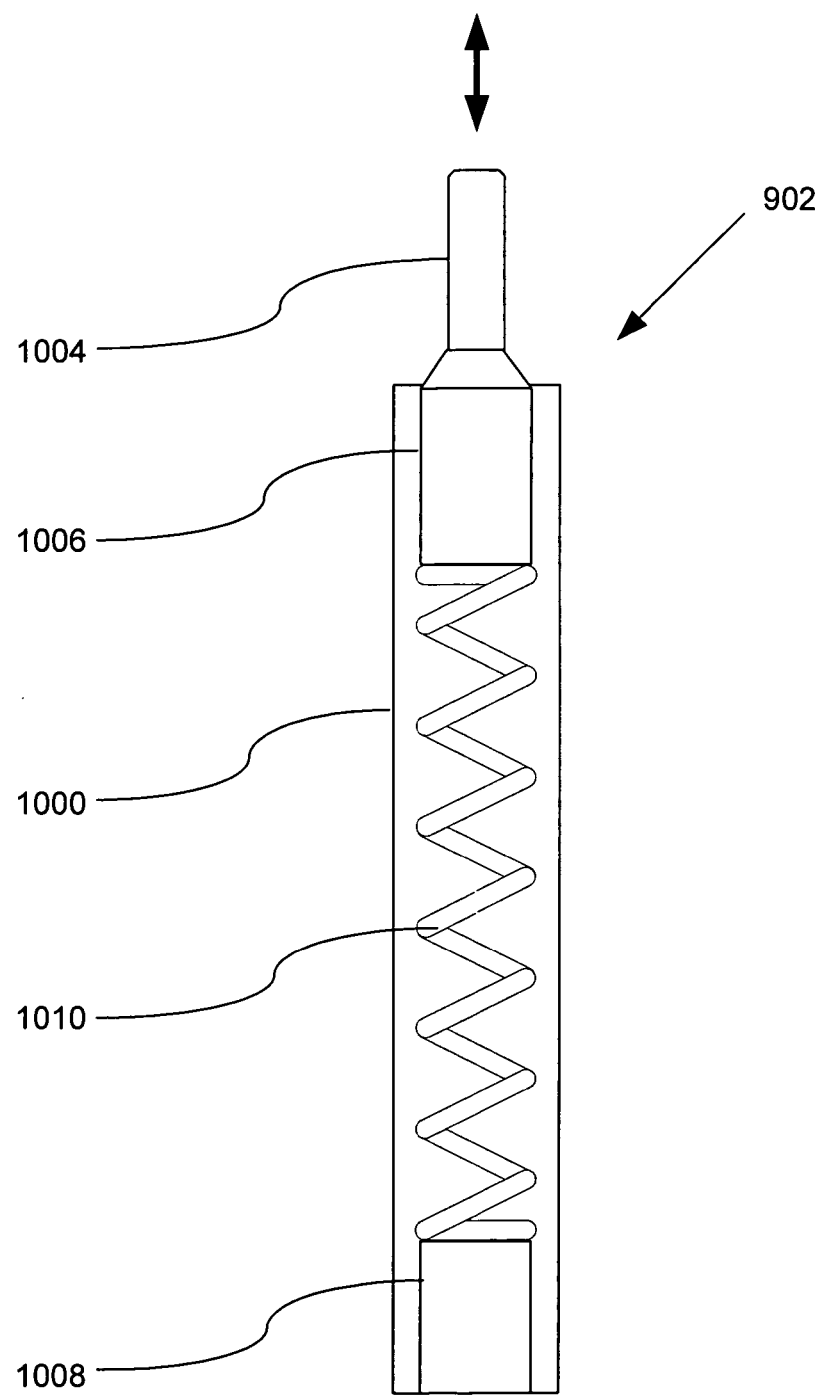
FIG. 10 is a cross-sectional side view of a pogo pin shown in FIG. 9A.
Figure 11C:
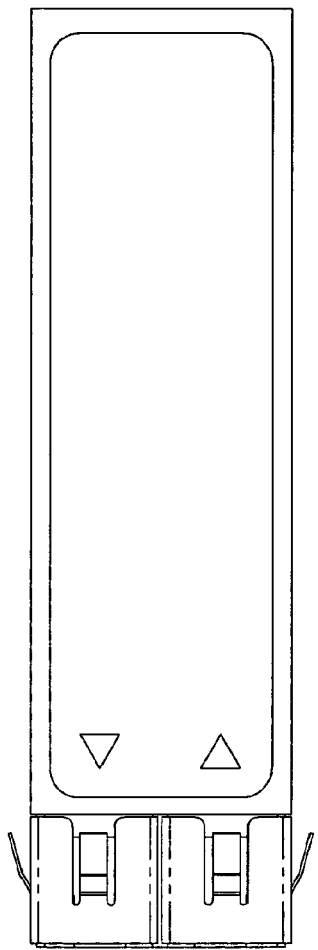
FIG. 11A is a side view, FIG. 11B a front view, FIG. 11C a top view, and FIG. 11D a bottom view of an optical transceiver module according to one other embodiment of the invention.
Figure 11A:
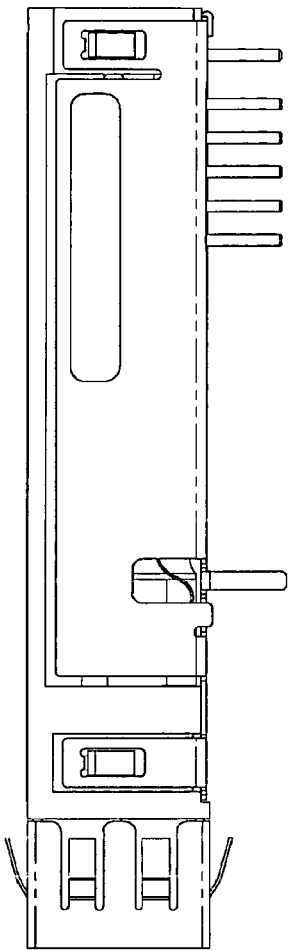
Figure 11D:
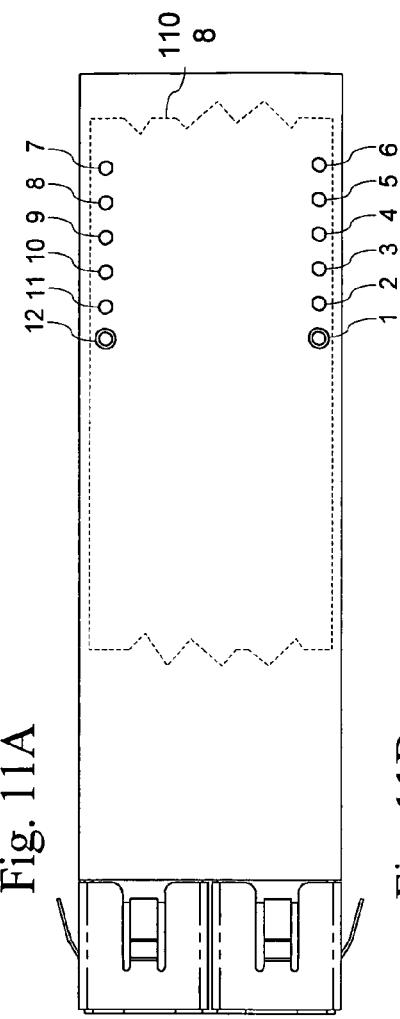
Figure 11B:
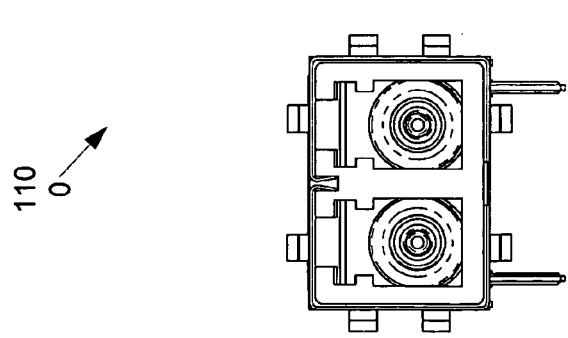

FIG. 10 is a cross-sectional side view of a pogo pin shown in FIG. 9A. The pogo pins 902 are spring-loaded conductive rods that provide an electrical connection between the host and the electrical contacts. In some embodiments, each pogo pin 902 includes a housing 1000 enclosing a first electrical connector 1006 coupled to an electrically conductive pin 104 configured and dimensioned to fit into hole H1 or H2 and make contact with electrical contacts C1 or C2. The pin 104 may have a blunted end, pointed end, crown-shaped end, or other appropriately shaped end, depending on the connection requirements. The housing 1000 also encloses a second electrical connector 1008 that is electrically coupled to the first electrical connector via a conductive spring 1010. The spring 1010 biases the first electrical connector 1006 away from the second electrical connector 1008. Although one type of pogo pin 902 is described above, it should be appreciated that any standard pogo pins may be used, as long as the pogo pins are configured and dimensioned to fit within the holes H1 or H2 and make electrical contact with the electrical contacts C1 and C2.

Accordingly, the same circuit board that attaches to the pins within the 2×10 SFF optical transceiver module 800 (FIG. 8) may be used within the 2×5 SFF optical transceiver module 900, as the location of pin 4 and pin 5 in the optical transceiver module 800 (FIG. 8) is the identical location as that of the electrical contacts C1 and C2 in the optical transceiver module 900. (In an alternative embodiment, the location of pins 16 and 17 match the location of the electrical contacts 906.) In other words, the identical circuit board can be used for the 2×5 SFF and the 2×10 SFF, the difference being that the 2×10 SFF includes pins 4 and 5 coupled to the circuit board whereas the 2×5 SFF includes electrical contacts C1 and C2 on the circuit board and corresponding holes H1 and H2 in the housing. This allows a single circuit board to be manufactured and used for both 2×5 SFF and 2×10 SFF optical transceiver modules, thereby reducing design, manufacturing and assembly costs.

FIGS. 11A-11D are similar to those of FIGS. 9A-9D except here the circuit board includes two rows of six parallel electrical contacts. In some embodiments, electrical contacts 1 and 12 are coupled to SDL and SCL pins. From the exterior, the optical transceiver module is similar in appearance to a regular or standard 2×6 SFF optical transceiver, i.e., has two rows of 6 pins in each row.

In other embodiments, holes are provided above electrical contacts 1 and 12 so that pogo pins can make contact with the electrical contacts, as described above in relation to FIGS. 9A-9D. From the exterior, the optical transceiver module is similar in appearance to a regular or standard 2×5 SFF optical transceiver, i.e., has two rows of 5 pins in each row.

The designations for the electrical contacts 1 and 12 may be as follows:

| Pin No. | Symbol | Functional Description |
| --- | --- | --- |
| 1 | SDL | Digital Diagnostic Data |
| 2 | $Vee_r$ | Receiver Signal Ground |
| 3 | $Vcc_r$ | Receiver Power Supply |
| 4 | SD | Signal Detect Normal Operation |
| 5 | RD− | Received Data Out Bar |
| 6 | RD+ | Received Data Out |
| 7 | $Vcc_t$ | Transmitter Power Supply |
| 8 | $Vee_t$ | Transmitter Signal Ground |
| 9 | TDis | Transmitter Disable |
| 10 | TD+ | Transmitter Data In |
| 11 | TD− | Transmitter Data In Bar |
| C2 | SCL | Clock |

The foregoing descriptions of specific embodiments of the present invention are presented for purposes of illustration and description. They are not intended to be exhaustive or to limit the invention to the precise forms disclosed. Obviously many modifications and variations are possible in view of the above teachings. For example, other embodiments may include fewer or more components, different combinations of components, different locations of the additional pins, or the like. Also, while the combination of all of the above functions is desired in the preferred embodiment of this transceiver controller, it should be obvious to one skilled in the art that a device which only implements a subset of these functions would also be of great use. Similarly, the present invention is also applicable to transmitters and receivers, and thus is not solely applicable to transceivers. It should also be pointed out that the controller of the present invention is suitable for application in multichannel optical links. Any references cited above are incorporated herein by reference. It is intended that the scope of the invention be defined by the following claims and their equivalents.

TABLE 1

MEMORY MAP FOR TRANSCEIVER CONTROLLER

| Memory Location (Array 0) | Name of Location | Function |
|---|---|---|
| 00h-5Fh | IEEE Data | This memory block is used to store required GBIC data |
| 60h | Temperature MSB | This byte contains the MSB of the 15-bit 2's complement temperature output from the temperature sensor. |
| 61h | Temperature LSB | This byte contains the LSB of the 15-bit 2's complement temperature output from the temperature sensor. (LSB is 0b). |
| 62h-63h | $V_{cc}$ Value | These bytes contain the MSB (62h) and the LSB (63h) of the measured $V_{cc}$ (15-bit number, with a 0b LSbit) |
| 64h-65h | $B_{in}$ Value | These bytes contain the MSB (64h) and the LSB (65h) of the measured $B_{in}$ (15-bit number, with a 0b LSbit) |
| 66h-67h | $P_{in}$ Value | These bytes contain the MSB (66h) and the LSB (67h) of the measured $P_{in}$ (15-bit number, with a 0b LSbit) |
| 68h-69h | $R_{in}$ Value | These bytes contain the MSB (68h) and the LSB (69h) of the measured $R_{in}$ (15-bit number, with a 0b LSbit) |
| 6Ah-6Dh | Reserved | Reserved |
| 6Eh | IO States | This byte shows the logical value of the I/O pins. |
| 6Fh | A/D Updated | Allows the user to verify if an update from the A/D has occurred to the 5 values: temperature, $V_{cc}$, $B_{in}$, $P_{in}$, and $R_{in}$. The user writes the byte to 00h. Once a conversion is complete for a give value, its bit will change to '1'. |
| 70h-73h | Alarm Flags | These bits reflect the state of the alarms as a conversion updates. High alarm bits are '1' if converted value is greater than corresponding high limit. Low alarm bits are '1' if converted value is less than corresponding low limit. Otherwise, bits are 0b. |
| 74h-77h | Warning Flags | These bits reflect the state of the warnings as a conversion updates. High warning bits are '1' if converted value is greater than corresponding high limit. Low warning bits are '1' if converted value is less than corresponding low limit. Otherwise, bits are 0b. |
| 78h-7Ah | Reserved | Reserved |
| 7Bh-7Eh | Password Entry Bytes PWE Byte 3 (7Bh) MSByte PWE Byte 2 (7Ch) PWE Byte 1 (7Dh) PWE Byte 0 (7Eh) LSByte | The four bytes are used for password entry. The entered password will determine the user's read/write privileges. |
| 7Fh | Array Select | Writing to this byte determines which of the upper pages of memory is selected for reading and writing. 0xh (Array x Selected) Where x = 1, 2, 3, 4 or 5 |
| 80h-F7h | | Customer EEPROM |
| 87h | DA % Adj | Scale output of D/A converters by specified percentage |

| | Name of Location | Function of Location |
|---|---|---|
| Memory Location (Array 1) | | |
| 00h-FFh | | Data EEPROM |
| Memory Location (Array 2) | | |
| 00h-Ffh | | Data EEPROM |

TABLE 1-continued

MEMORY MAP FOR TRANSCEIVER CONTROLLER

Memory Location (Array 3)

| Address | Name | Description |
|---|---|---|
| 80h-81h<br>88h-89h<br>90h-91h<br>98h-99h<br>A0h-A1h | Temperature High Alarm<br>$V_{cc}$ High Alarm<br>$B_{in}$ High Alarm<br>$P_{in}$ High Alarm<br>$R_{in}$ High Alarm | The value written to this location serves as the high alarm limit. Data format is the same as the corresponding value (temperature, $V_{cc}$, $B_{in}$, $P_{in}$, $R_{in}$). |
| 82h-83h<br>8Ah-8Bh<br>92h-93h<br>9Ah-9Bh<br>A2h-A3h | Temperature Low Alarm<br>$V_{cc}$ Low Alarm<br>$B_{in}$ Low Alarm<br>$P_{in}$ Low Alarm<br>$R_{in}$ Low Alarm | The value written to this location serves as the low alarm limit. Data format is the same as the corresponding value (temperature, $V_{cc}$, $B_{in}$, $P_{in}$, $R_{in}$). |
| 84h-85h<br>8Ch-8Dh<br>94h-95h<br>9Ch-9Dh<br>A4h-A5h | Temp High Warning<br>$V_{cc}$ High Warning<br>$B_{in}$ High Warning<br>$P_{in}$ High Warning<br>$R_{in}$ High Warning | The value written to this location serves as the high warning limit. Data format is the same as the corresponding value (temperature, $V_{cc}$, $B_{in}$, $P_{in}$, $R_{in}$). |
| 86h-87h<br>8Eh-8Fh<br>96h-97h<br>9Eh-9Fh<br>A6h-A7h | Temperature Low Warning<br>$V_{cc}$ Low Warning<br>$B_{in}$ Low Warning<br>$P_{in}$ Low Warning<br>$R_{in}$ Low Warning | The value written to this location serves as the low warning limit. Data format is the same as the corresponding value (temperature, $V_{cc}$, $B_{in}$, $P_{in}$, $R_{in}$). |
| A8h-AFh, C5h<br>B0h-B7h, C6h<br>B8h-BFh, C7h | $D_{out}$ control 0-8<br>$F_{out}$ control 0-8<br>$L_{out}$ control 0-8 | Individual bit locations are defined in Table 4. |
| C0h | Reserved | Reserved |
| C1h | Prescale | Selects MCLK divisor for X-delay CLKS. |
| C2h | $D_{out}$ Delay | Selects number of prescale clocks |
| C3h | $F_{out}$ Delay | |
| C4h | $L_{out}$ Delay | |
| C8h-C9h<br>CAh-CBh<br>CCh-CDh<br>CEh-CFh | $V_{cc}$ - A/D Scale<br>$B_{in}$ - A/D Scale<br>$P_{in}$ - A/D Scale<br>$R_{in}$ - A/D Scale | 16 bits of gain adjustment for corresponding A/D conversion values. |
| D0h | Chip Address | Selects chip address when external pin ASEL is low. |
| D1h | Margin #2 | Finisar Selective Percentage (FSP) for D/A #2 |
| D2h | Margin #1 | Finisar Selective Percentage (FSP) for D/A #1 |
| D3h-D6h | PW1 Byte 3 (D3h) MSB<br>PW1 Byte 2 (D4h)<br>PW1 Byte 1 (D5h)<br>PW1 Byte 0 (D6h) LSB | The four bytes are used for password 1 entry. The entered password will determine the Finisar customer's read/write privileges. |
| D7h | D/A Control | This byte determines if the D/A outputs source or sink current, and it allows for the outputs to be scaled. |
| D8h-DFh | $B_{in}$ Fast Trip | These bytes define the fast trip comparison over temperature. |
| E0h-E3h | $P_{in}$ Fast Trip | These bytes define the fast trip comparison over temperature. |
| E4h-E7h | $R_{in}$ Fast Trip | These bytes define the fast trip comparison over temperature. |
| E8h | Configuration Override Byte | Location of the bits is defined in Table 4 |
| E9h | Reserved | Reserved |
| EAh-EBh | Internal State Bytes | Location of the bits is defined in Table 4 |
| ECh | I/O States 1 | Location of the bits is defined in Table 4 |
| EDh-EEh | D/A Out | Magnitude of the temperature compensated D/A outputs |
| EFh | Temperature Index | Address pointer to the look-up Arrays |
| F0h-FFh | Reserved | Reserved |

Memory Location (Array 4)

| Address | | Description |
|---|---|---|
| 00h-Ffh | | D/A Current vs. Temp #1 (User-Defined Look-up Array #1) |

TABLE 1-continued

MEMORY MAP FOR TRANSCEIVER CONTROLLER

Memory
Location
(Array 5)

00h-Ffh                 D/A Current vs. Temp #2
                        (User-Defined Look-up Array #2)

TABLE 2

DETAIL MEMORY DESCRIPTIONS - A/D VALUES AND STATUS BITS

| Byte | Bit | Name | Description |
|---|---|---|---|
| Converted analog values. Calibrated 16 bit data. (See Notes 1-2) | | | |
| 96 (60h) | All | Temperature MSB | Signed 2's complement integer temperature (−40 to +125 C.) Based on internal temperature measurement |
| 97 | All | Temperature LSB | Fractional part of temperature (count/256) |
| 98 | All | $V_{cc}$ MSB | Internally measured supply voltage in transceiver. Actual voltage is full 16 bit value * 100 uVolt. |
| 99 | All | $V_{cc}$ LSB | (Yields range of 0-6.55 V) |
| 100 | All | TX Bias MSB | Measured TX Bias Current in mA Bias current is full 16 bit value *(1/256) mA. |
| 101 | All | TX Bias LSB | (Full range of 0-256 mA possible with 4 uA resolution) |
| 102 | All | TX Power MSB | Measured TX output power in mW. Output is full 16 bit value *(1/2048) mW. (see note 5) |
| 103 | All | TX Power LSB | (Full range of 0-32 mW possible with 0.5 μW resolution, or −33 to +15 dBm) |
| 104 | All | RX Power MSB | Measured RX input power in mW RX power is full 16 bit value *(1/16384) mW. (see note 6) |
| 105 | All | RX Power LSB | (Full range of 0-4 mW possible with 0.06 μW resolution, or −42 to +6 dBm) |
| 106 | All | Reserved MSB | Reserved for $1^{st}$ future definition of digitized analog input |
| 107 | All | Reserved LSB | Reserved for $1^{st}$ future definition of digitized analog input |
| 108 | All | Reserved MSB | Reserved for $2^{nd}$ future definition of digitized analog input |
| 109 | All | Reserved LSB | Reserved for $2^{nd}$ future definition of digitized analog input |
| 110 | 7 | TX Disable | Digital state of the TX Disable Input Pin |
| 110 | 6 | Reserved | |
| 110 | 5 | Reserved | |
| 110 | 4 | Rate Select | Digital state of the SFP Rate Select Input Pin |
| 110 | 3 | Reserved | |
| 110 | 2 | TX Fault | Digital state of the TX Fault Output Pin |
| 110 | 1 | LOS | Digital state of the LOS Output Pin |
| 110 | 0 | Power-On-Logic | Indicates transceiver has achieved power up and data valid |
| 111 | 7 | Temp A/D Valid | Indicates A/D value in Bytes 96/97 is valid |
| 111 | 6 | $V_{cc}$ A/D Valid | Indicates A/D value in Bytes 98/99 is valid |
| 111 | 5 | TX Bias A/D Valid | Indicates A/D value in Bytes 100/101 is valid |
| 111 | 4 | TX Power A/D Valid | Indicates A/D value in Bytes 102/103 is valid |
| 111 | 3 | RX Power A/D Valid | Indicates A/D value in Bytes 104/105 is valid |
| 111 | 2 | Reserved | Indicates A/D value in Bytes 106/107 is valid |
| 111 | 1 | Reserved | Indicates A/D value in Bytes 108/109 is valid |
| 111 | 0 | Reserved | Reserved |

TABLE 3

DETAIL MEMORY DESCRIPTIONS - ALARM AND WARNING FLAG BITS
Alarm and Warning Flag Bits

| Byte | Bit | Name | Description |
|---|---|---|---|
| 112 | 7 | Temp High Alarm | Set when internal temperature exceeds high alarm level. |
| 112 | 6 | Temp Low Alarm | Set when internal temperature is below low alarm level. |
| 112 | 5 | $V_{cc}$ High Alarm | Set when internal supply voltage exceeds high alarm level. |
| 112 | 4 | $V_{cc}$ Low Alarm | Set when internal supply voltage is below low alarm level. |
| 112 | 3 | TX Bias High Alarm | Set when TX Bias current exceeds high alarm level. |
| 112 | 2 | TX Bias Low Alarm | Set when TX Bias current is below low alarm level. |
| 112 | 1 | TX Power High Alarm | Set when TX output power exceeds high alarm level. |
| 112 | 0 | TX Power Low Alarm | Set when TX output power is below low alarm level. |
| 113 | 7 | RX Power High Alarm | Set when Received Power exceeds high alarm level. |
| 113 | 6 | RX Power Low Alarm | Set when Received Power is below low alarm level. |
| 113 | 5-0 | Reserved Alarm | |
| 114 | All | Reserved | |
| 115 | All | Reserved | |
| 116 | 7 | Temp High Warning | Set when internal temperature exceeds high warning level. |
| 116 | 6 | Temp Low Warning | Set when internal temperature is below low warning level. |
| 116 | 5 | $V_{cc}$ High Warning | Set when internal supply voltage exceeds high warning level. |
| 116 | 4 | $V_{cc}$ Low Warning | Set when internal supply voltage is below low warning level. |
| 116 | 3 | TX Bias High Warning | Set when TX Bias current exceeds high warning level. |
| 116 | 2 | TX Bias Low Warning | Set when TX Bias current is below low warning level. |
| 116 | 1 | TX Power High Warning | Set when TX output power exceeds high warning level. |
| 116 | 0 | TX Power Low Warning | Set when TX output power is below low warning level. |
| 117 | 7 | RX Power High Warning | Set when Received Power exceeds high warning level. |
| 117 | 6 | RX Power Low Warning | Set when Received Power is below low warning level. |
| 117 | 5 | Reserved Warning | |
| 117 | 4 | Reserved Warning | |
| 117 | 3 | Reserved Warning | |
| 117 | 2 | Reserved Warning | |
| 117 | 1 | Reserved Warning | |
| 117 | 0 | Reserved Warning | |
| 118 | All | Reserved | |
| 119 | All | Reserved | |

TABLE 4

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl0 | T alrm hi set | T alrm lo set | V alrm hi set | V alrm lo set | B alrm hi set | B alrm lo set | P alrm hi set | P alrm lo set |
| X-out cntl1 | R alrm hi set | R alrm lo set | B ft hi set | P ft hi set | R ft hi set | D-in inv set | D-in set | F-in inv set |
| X-out cntl2 | F-in set | L-in inv set | L-in set | Aux inv set | Aux set | T alrm hi hib | T alrm lo hib | V alrm hi hib |
| X-out cntl3 | V alrm lo hib | B alrm hi hib | B alrm lo hib | P alrm hi hib | P alrm lo hib | R alrm hi hib | R alrm lo hib | B ft hi hib |
| X-out cntl4 | P ft hi hib | R ft hi hib | D-in inv hib | D-in hib | F-in inv hib | F-in hib | L-in inv hib | L-in hib |
| X-out cntl5 | Aux inv hib | Aux hib | T alrm hi clr | T alrm lo clr | V alrm hi clr | V alrm lo clr | B alrm hi clr | B alrm lo clr |
| X-out cntl6 | P alrm hi clr | P alrm lo clr | R alrm hi clr | R alrm lo clr | B ft hi clr | P ft hi clr | R ft hi clr | D-in inv clr |

TABLE 4-continued

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl7 | D-in clr | F-in inv clr | F-in clr | L-in inv clr | L-in clr | Aux inv clr | Aux clr | EE |
| X-out cntl8 | latch select | invert | o-ride data | o-ride select | S reset data | HI enable | LO enable | Pullup enable |
| Prescale | reserved | reserved | Reserved | reserved | $B^3$ | $B^2$ | $B^1$ | $B^0$ |
| X-out delay | $B^7$ | $B^6$ | $B^5$ | $B^4$ | $B^3$ | $B^2$ | $B^1$ | $B^0$ |
| chip address | $b^7$ | $b^6$ | $b^5$ | $b^4$ | $b^3$ | $b^2$ | $b^1$ | X |
| X-ad scale MSB | $2^{15}$ | $2^{14}$ | $2^{13}$ | $2^{12}$ | $2^{11}$ | $2^{10}$ | $2^9$ | $2^8$ |
| X-ad scale LSB | $2^7$ | $2^6$ | $2^5$ | $2^4$ | $2^3$ | $2^2$ | $2^1$ | $2^0$ |
| D/A cntl | source/sink 1/0 | $2^2$ | D/A #2 range $2^1$ | $2^0$ | source/sink 1/0 | $2^2$ | D/A #1 range $2^1$ | $2^0$ |
| config/O-ride | manual D/A | manual index | manual AD alarm | EE Bar | SW-POR | A/D Enable | Manual fast alarm | reserved |
| Internal State 1 | D-set | D-inhibit | D-delay | D-clear | F-set | F-inhibit | F-delay | F-clear |
| Internal State 0 | L-set | L-inhibit | L-delay | L-clear | reserved | reserved | reserved | reserved |
| I/O States 1 | reserved | F-in | L-in | reserved | D-out | reserved | reserved | reserved |
| Margin #1 | Reserved | Neg_Scale2 | Neg_Scale1 | Neg_Scale0 | Reserved | Pos_Scale2 | Pos_Scale1 | Pos_Scale0 |
| Margin #2 | Reserved | Neg_Scale2 | Neg_Scale1 | Neg_Scale0 | Reserved | Pos_Scale2 | Pos_Scale1 | Pos_Scale0 |

What is claimed is:

1. An optoelectronic transceiver, comprising:
a housing;
an optical transmitter positioned at least partially within said housing;
an optical receiver positioned at least partially within said housing;
a controller disposed at least partially within said housing, said controller comprising:
memory, including one or more memory arrays for storing information related to the transceiver;
analog to digital conversion circuitry for receiving a plurality of analog signals from the optoelectronic transceiver, the analog signals corresponding to operating conditions of the optoelectronic transceiver, converting the received analog signals into digital values, and storing the digital values in the memory;
comparison logic for comparing the digital values with limit values to generate flag values, wherein the flag values are stored in the memory when generated by the optoelectronic transceiver;
an interface configured to allow a host to read from host specified locations within the memory;
a circuit board disposed at least partially within said housing;
a first row of at least five electrical contacts on said circuit board;
a second row of at least six electrical contacts on said circuit board, where said second row is substantially parallel to said first row; and
at least ten elongate pins each extending from a respective one of said electrical contacts substantially perpendicular to said circuit board, wherein at least one of said electrical contacts from said second row is electrically coupled to said interface.

2. The optical transceiver module of claim 1, wherein said optical transmitter is configured for transmitting light along a first axis, said optical receiver is configured for receiving light along a second axis, substantially parallel to said first axis, and said circuit board is substantially parallel to a plane formed between said first and second axes.

3. The optical transceiver module of claim 1, wherein said first row includes ten electrical contacts and second row includes ten electrical contacts.

4. The optical transceiver module of claim 3, wherein said first row includes ten pins and second row includes ten pins, each electrically coupled to a respective electrical contact.

5. The optical transceiver module of claim 4, wherein pin 4 and pin 5 of the first row of ten pins are coupled to said interface.

6. The optical transceiver module of claim 1, wherein said housing defines holes therein for said pins to extend there-through.

7. The optical transceiver module of claim 1, wherein said second row includes seven electrical contacts.

8. The optical transceiver module of claim 7, further comprising two holes in said housing, where each of said two holes is aligned with a respective one of said seven electrical contacts on said circuit board.

9. The optical transceiver module of claim 8, wherein each of said two holes is configured and dimensioned to receive a pogo pin there-through, where each said pogo pin is configured to make contact with a respective one of said seven electrical contacts.

10. The optical transceiver module of claim 1, wherein said optoelectronic transceiver has the same pin arrangement as a 2×5 Small Form Factor (SFF) optoelectronic transceiver.

11. The optical transceiver module of claim 1, wherein said optoelectronic transceiver has the same pin arrangement as a 2×10 Small Form Factor (SFF) optoelectronic transceiver.

12. The optical transceiver module of claim 1, wherein said optoelectronic transceiver has the same pin-out layout as a 2×6 Small Form Factor (SFF) optoelectronic transceiver.

13. The optical transceiver module of claim 1, wherein one of said electrical contacts is configured as a serial communication data out, and another of said electrical contacts is configured as a serial communication clock out.

14. The optical transceiver module of claim 1, wherein each of said ten elongate pins is a pin selected from a group consisting of: a serial communication data pin, a receiver ground pin, a receiver power pin, a signal detect pin, a receive data inverted pin, a receive data pin, a serial communication clock pin, a transmitter power pin, a transmitter ground pin, a transmitter disable pin, a transmit data pin, and a transmit data inverted pin.

15. The optical transceiver module of claim 1, further comprising a plurality of components selected from a group consisting of: a laser driver, a laser bias controller, a power controller, a pre-amplifier, a post-amplifier, a laser wavelength controller, a main controller, an electrothermal cooler, an analog-to-digital converter, a digital-to analog converter, and an Avalanche Photodiode bias controller positioned within said housing.

16. The optical transceiver module of claim 1, wherein said interface is a serial digital interface.

17. The optical transceiver module of claim 1, wherein the interface is compatible with one of I$^2$C serial communication or MDIO serial communication.

18. The optical transceiver module of claim 1, wherein the pins are configured and arranged for substantial conformity with the Small Form Factor (SFF) configuration standard.

19. An optoelectronic transceiver, comprising:
   a housing;
   an optical transmitter positioned at least partially within said housing;
   an optical receiver positioned at least partially within said housing;
   memory positioned at least partially within said housing, wherein said memory is configured to store information relating to operation of the transceiver;
   comparison logic for comparing the digital values with limit values to generate flag values, wherein the flag values are stored in the memory when generated by the optoelectronic transceiver;
   an interface configured to allow a host to read from host specified locations within the memory;
   a first row of at least five electrical contacts disposed at least partially within said housing;
   a second row of at least seven electrical contacts disposed at least partially within said housing, where said second row is substantially parallel to said first row; and
   at least ten elongate pins each extending from a respective one of said electrical contacts substantially perpendicular one side of said housing, wherein at least two of said electrical contacts are electrically coupled to said interface.

20. An optoelectronic transceiver, comprising:
   a housing;
   an optical transmitter disposed at least partially within said housing;
   an optical receiver disposed at least partially within said housing;
   memory disposed at least partially within said housing and configured for storing information relating to operation of the transceiver;
   comparison logic for comparing the digital values with limit values to generate flag values, wherein the flag values are stored in the memory when generated by the optoelectronic transceiver;
   an interface disposed at least partially within said housing and configured to allow a host to read from host specified locations within the memory;
   a first row of at least five substantially parallel and elongate pins extending from said housing;
   a second row of at least five substantially parallel and elongate pins extending from said housing, wherein said second row is substantially parallel to said first row;
   two electrical contacts each aligned with at least one of said first and second rows, wherein said two electrical contacts are configured to be electrically coupled to said interface.

21. The optical transceiver module of claim 20, wherein said pins are configured and arranged for substantial conformity with a 2×5 or a 2×6 Small Form Factor (SFF) configuration standard.

22. The optical transceiver module of claim 20, wherein said two electrical contacts are configured to be coupled to a host via pins or pogo pins.

23. An optoelectronic transceiver, comprising:
   a housing;
   an optical transmitter disposed at least partially within said housing;
   an optical receiver disposed at least partially within said housing;
   memory disposed at least partially within said housing and configured for storing information relating to operation of the transceiver;
   comparison logic for comparing the digital values with limit values to generate flag values, wherein the flag values are stored in the memory when generated by the optoelectronic transceiver;
   an interface disposed at least partially within said housing and configured to allow a host to read from host specified locations within the memory;
   a first row of at least ten substantially parallel and elongate pins extending from said housing;
   a second row of at least ten substantially parallel and elongate pins extending from said housing, wherein said second row is substantially parallel to said first row, and wherein two of said second row of pins are electrically coupled to said interface.

24. The optical transceiver module of claim 23, wherein the pins are configured and arranged for substantial conformity with the 2×10 Small Form Factor (SFF) configuration standard, but for the use of the two second row pins that are electrically coupled to the interface.

25. The optical transceiver module of claim 23, wherein said two of said second row of pins are located at pin 4 and pin 5 locations of the 2×10 Small Form Factor (SFF) configuration standard.

* * * * *